United States Patent
Noda et al.

(10) Patent No.: US 8,565,754 B2
(45) Date of Patent: Oct. 22, 2013

(54) COMMUNICATION DEVICE, COMMUNICATION SYSTEM, AND COMMUNICATION METHOD

(75) Inventors: Masahide Noda, Kawasaki (JP); Kazuki Matsui, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 336 days.

(21) Appl. No.: 12/816,453

(22) Filed: Jun. 16, 2010

(65) Prior Publication Data

US 2010/0323686 A1  Dec. 23, 2010

(30) Foreign Application Priority Data

Jun. 17, 2009 (JP) ................... 2009-144392

(51) Int. Cl.
*H04W 24/00* (2009.01)

(52) U.S. Cl.
USPC .............. 455/423; 370/241; 455/424; 455/45

(58) Field of Classification Search
USPC ................ 455/422.1–425; 370/241, 242–245
See application file for complete search history.

(56) References Cited

U.S. PATENT DOCUMENTS

| 5,471,650 | A  | * | 11/1995 | Vexler et al. ................. 455/69 |
| 8,121,591 | B2 | * | 2/2012 | Topaltzas ...................... 455/423 |
| 2002/0155816 | A1 | * | 10/2002 | Fodor et al. ................. 455/67.1 |
| 2003/0069011 | A1 | * | 4/2003 | Bonnifait et al. ............ 455/423 |
| 2004/0073641 | A1 | * | 4/2004 | Minhazuddin et al. ....... 709/223 |
| 2004/0202107 | A1 | * | 10/2004 | Bensimon et al. ............ 370/229 |
| 2006/0073786 | A1 | * | 4/2006 | Sarkar .............................. 455/24 |
| 2010/0020717 | A1 | * | 1/2010 | McGregor et al. ............ 370/252 |
| 2010/0135172 | A1 | * | 6/2010 | Cui et al. ...................... 370/252 |
| 2010/0261470 | A1 | * | 10/2010 | Donovan et al. ............. 455/424 |

FOREIGN PATENT DOCUMENTS

| JP | 2005-236397 | 9/2005 |
| JP | 2007-36839 | 2/2007 |
| JP | 2007-166100 | 6/2007 |
| JP | 2008-160754 | 7/2008 |

* cited by examiner

*Primary Examiner* — Ajit Patel
(74) *Attorney, Agent, or Firm* — Staas & Halsey LLP

(57) ABSTRACT

A communication device includes: an obtaining unit that obtains use state information of the communication device during a call with another communication device; and a transmission unit that transmits an obtaining command for use state information of the other communication device to the other communication device and the use state information obtained to an external part.

20 Claims, 34 Drawing Sheets

| USER ID | TELEPHONE NUMBER | URI |
|---------|------------------|-----|
| 002 | 03-****-5678 | 002@example.com |
| 003 | 06-****-4321 | 003@example.com |
| 004 | 050-***-6543 | 004@example.com |
| ... | ... | ... |

FIG.6

| CALL ID | OUTGOING SIDE TELEPHONE NUMBER | RECEPTION SIDE TELEPHONE NUMBER | CALL START TIME | CALL END TIME |
|---|---|---|---|---|
| 001 | 03-**-5678 | 06-**-4321 | 2009/05/20/11:00:00 | 2009/05/20/11:10:00 |
| 002 | 050-*-6543 | 02-**-7890 | 2009/05/20/12:00:00 | 2009/05/20/12:10:00 |
| ... | ... | ... | ... | ... |

| MODEL NAME | MODEL A | MODEL B | MODEL C |
|---|---|---|---|
| WIRELESS STANDARD | IEEE802.11a | IEEE802.11b | IEEE802.11g | IEEE802.16a |

| | BATTERY REMAINING AMOUNT | EARPHONE MICROPHONE | RECEPTION INTENSITY | CHANGE OF ACCESS POINT | MOVING SPEED |
|---|---|---|---|---|---|
| | 3 OR HIGHER | ABSENT | 3 OR HIGHER | ABSENT | 2 m/s OR LOWER |

| CALL ID | TELEPHONE NUMBER | | MODEL NAME | WIRELESS STANDARD | BATTERY REMAINING AMOUNT | EARPHONE MICROPHONE | RECEPTION INTENSITY | ACCESS POINT | MOVING SPEED |
|---|---|---|---|---|---|---|---|---|---|
| 001 | 03-XX | 05/20/11:00:30 | A | 11a | 4 | ABSENT | 5 | ABSENT (AP1) | 0.5 |
| 001 | 06-XX | 05/20/11:00:30 | A | 11a | 4 | PRESENT | 4 | ABSENT (AP3) | 1.0 |
| ... | ... | 05/20/11:00:40 | ... | ... | ... | ... | ... | ... | ... |

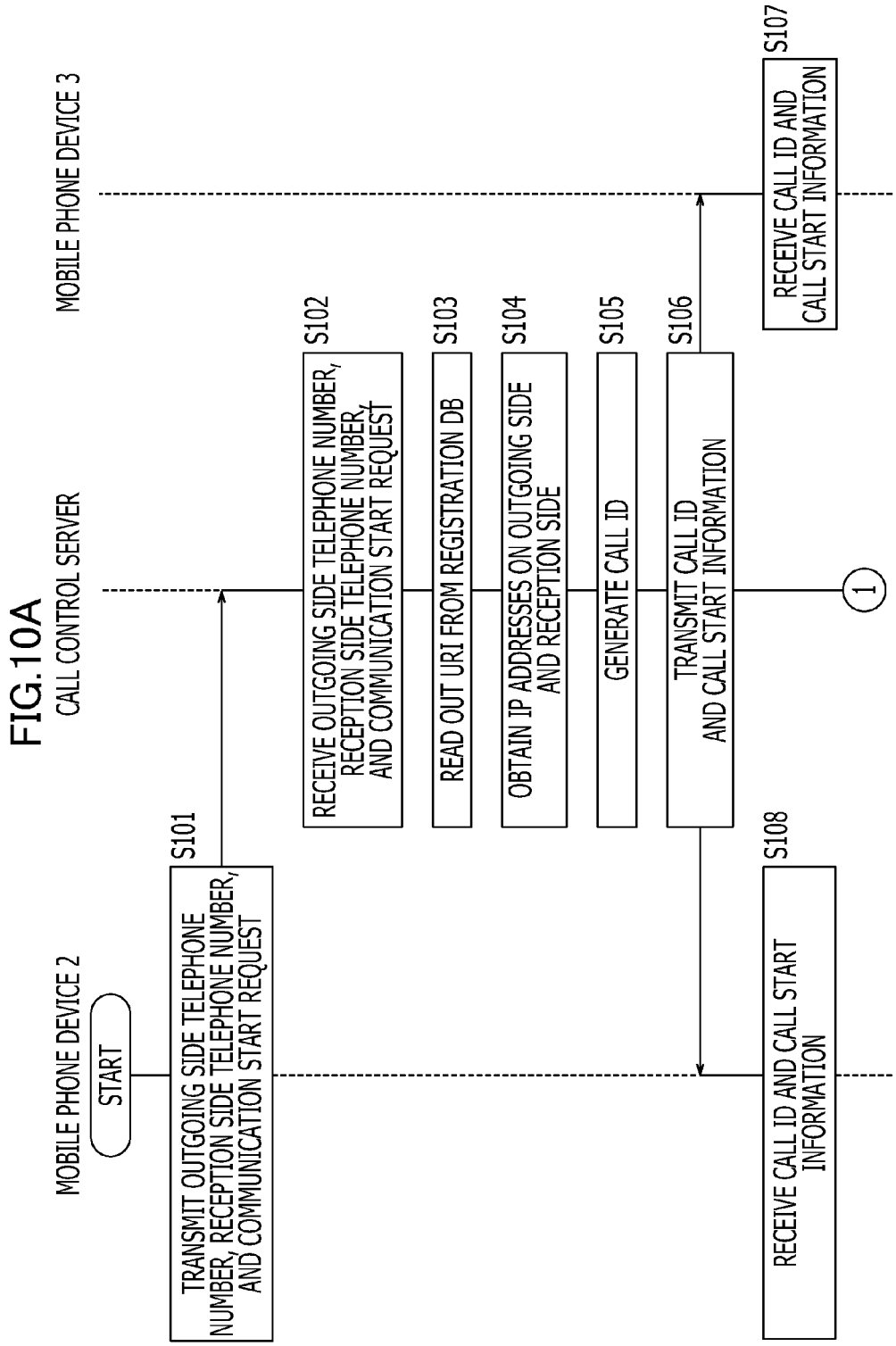

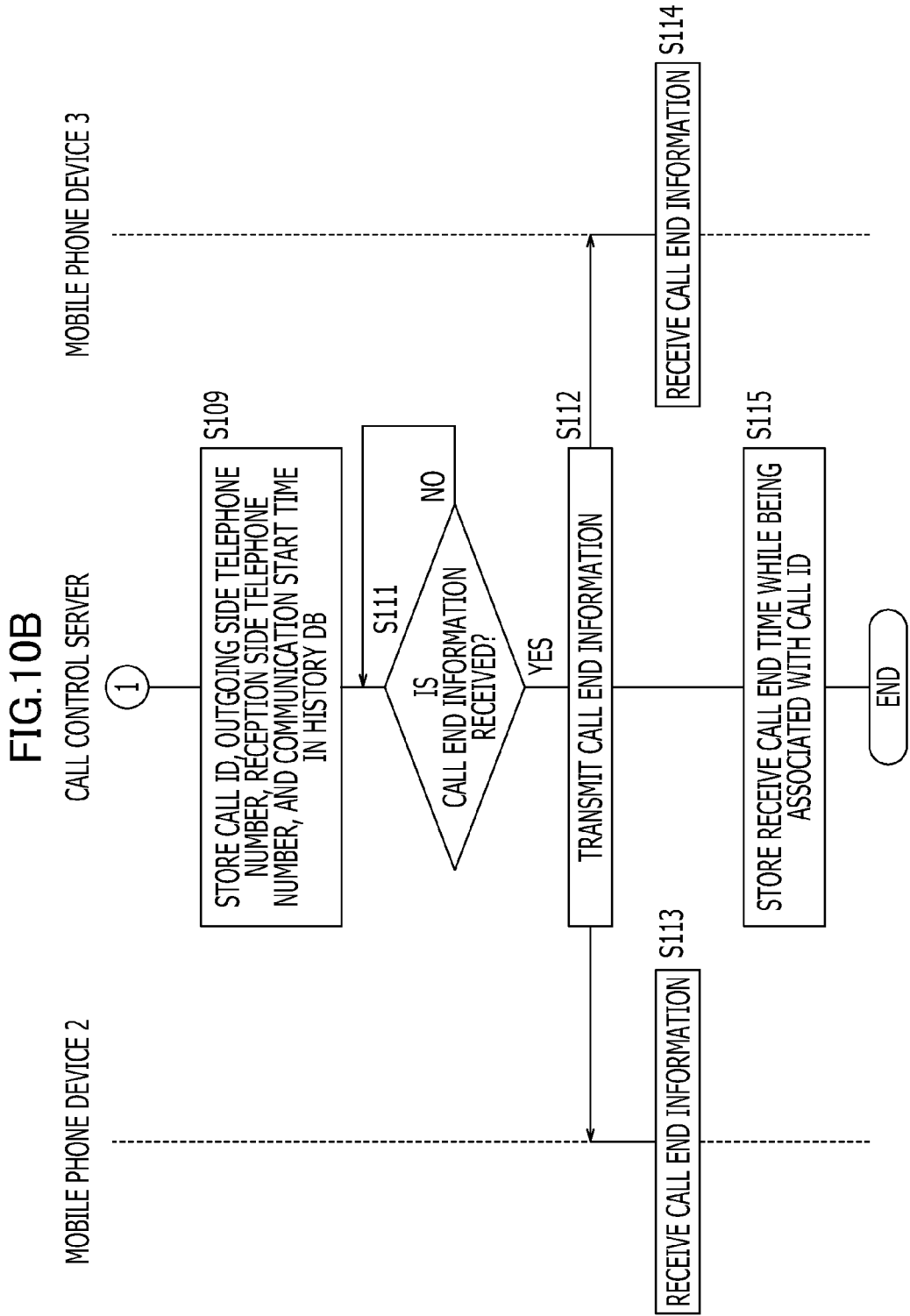

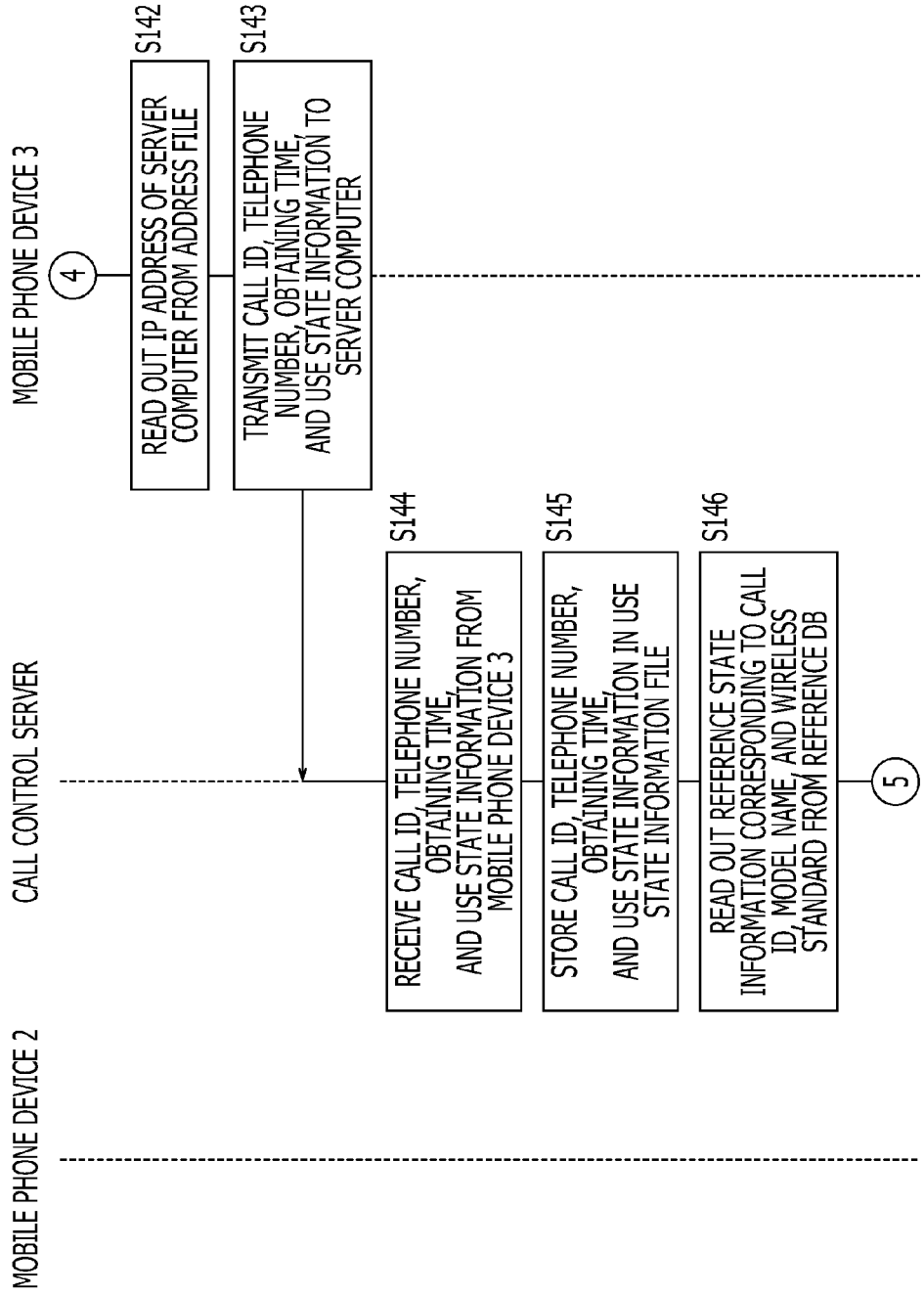

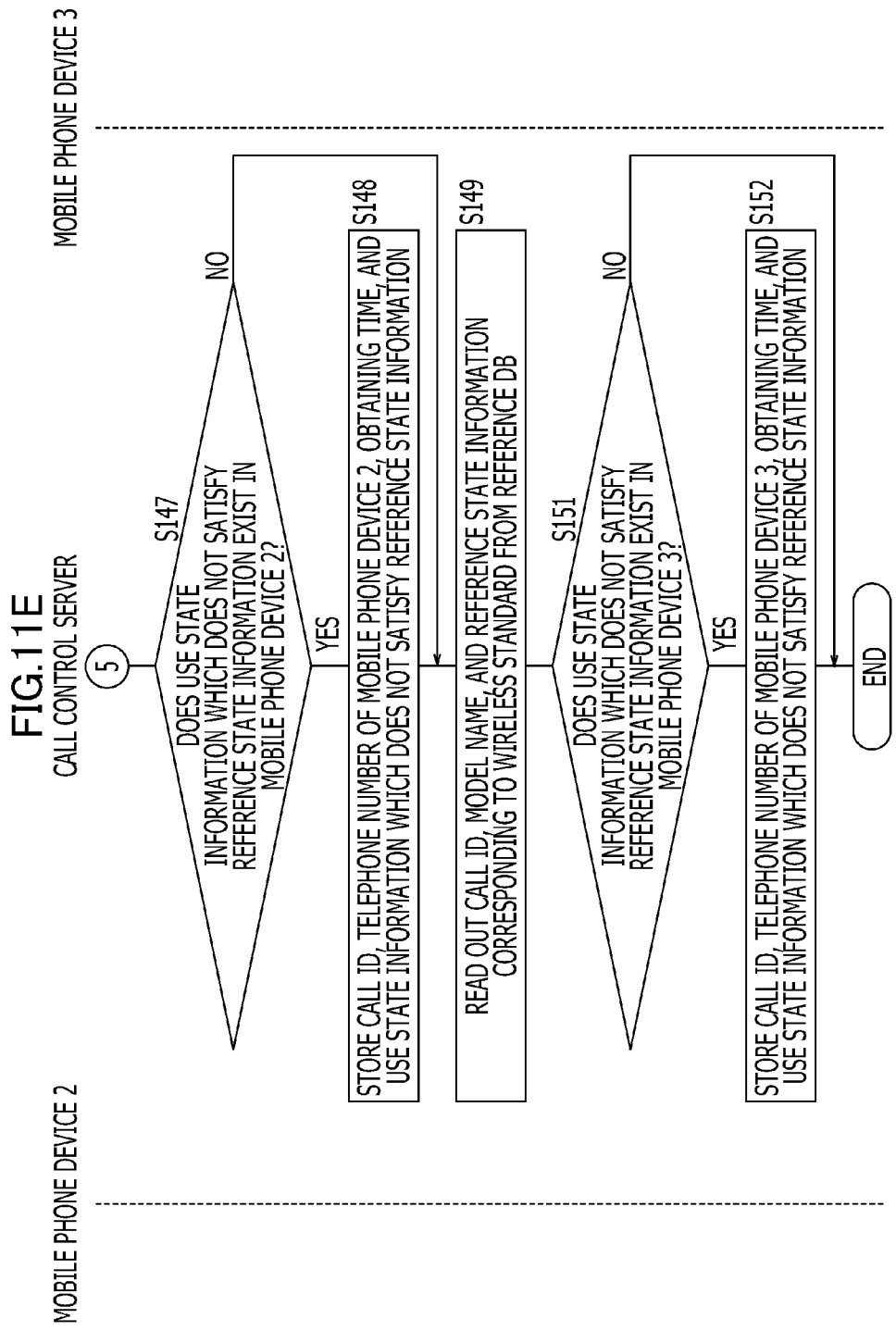

FIG.13

| CHANGE IN BATTERY REMAINING AMOUNT | CHANGE OF EARPHONE MICROPHONE | CHANGE IN RECEPTION INTENSITY | CHANGE OF ACCESS POINT | CHANGE IN MOVING SPEED |
|---|---|---|---|---|
| REDUCED | FROM ABSENT TO PRESENT | DECREASED | FROM ABSENT TO PRESENT | INCREASED BY PREDETERMINED SPEED |

| CALL ID | TELEPHONE NUMBER | | MODEL NAME | WIRELESS STANDARD | BATTERY REMAINING AMOUNT | EARPHONE MICROPHONE | RECEPTION INTENSITY | ACCESS POINT | MOVING SPEED |
|---|---|---|---|---|---|---|---|---|---|
| 001 | 03-XX | 05/20/11:00:30 | A | 11a | 4 | ABSENT | 5 | ABSENT (AP1) | 0.5 |
| 001 | 06-XX | 05/20/11:00:40 | A | 11a | 4 | PRESENT | 4 | ABSENT (AP3) | 1.0 |
| 001 | 03-XX | 05/20/11:00:45 | A | 11a | 4 | ABSENT | 5 | ABSENT (AP2) | 0.5 |
| 001 | 06-XX | 05/20/11:00:55 | A | 11a | 4 | PRESENT | 4 | ABSENT (AP3) | 1.0 |
| ... | ... | ... | ... | ... | ... | ... | ... | ... | ... |

153

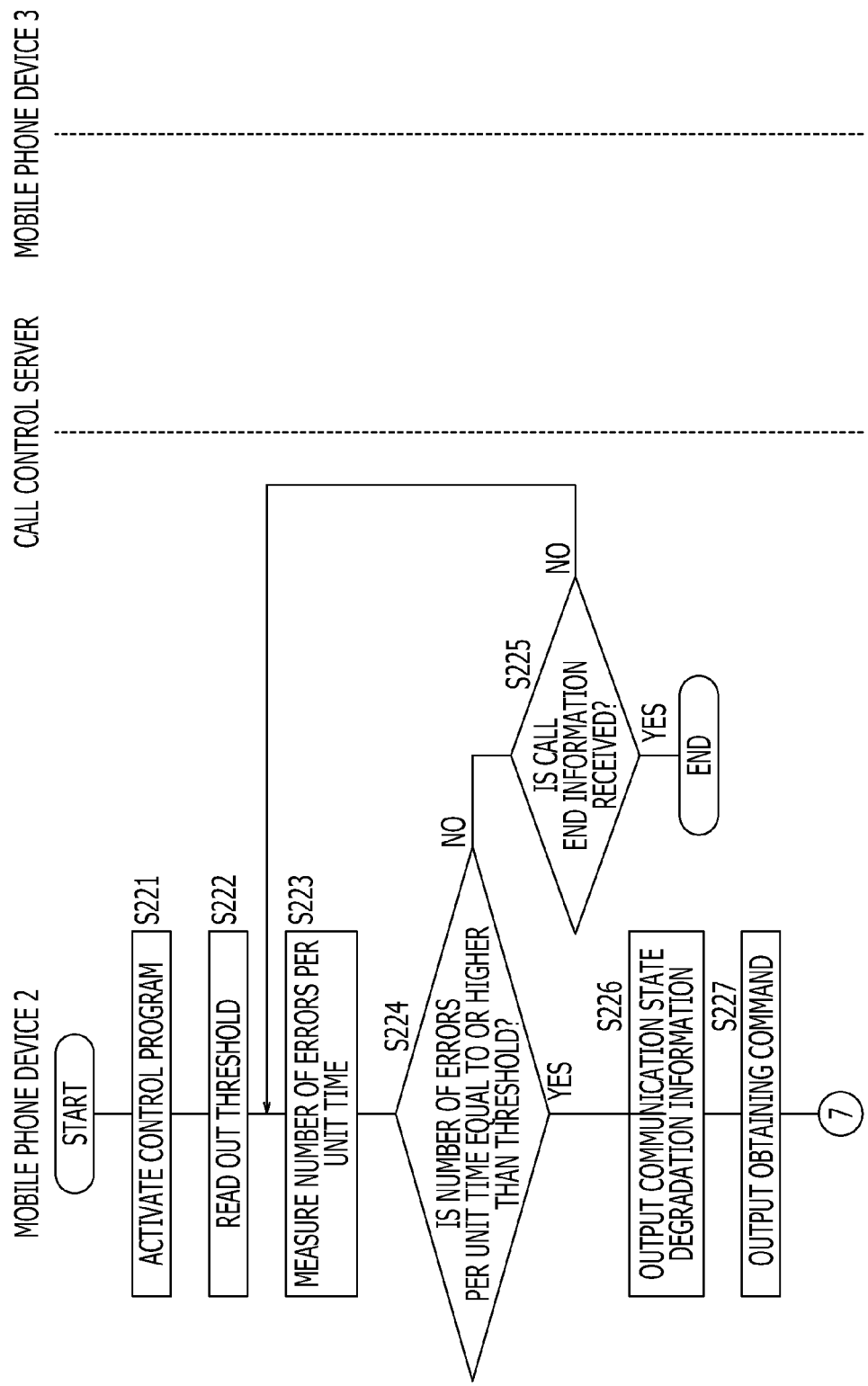

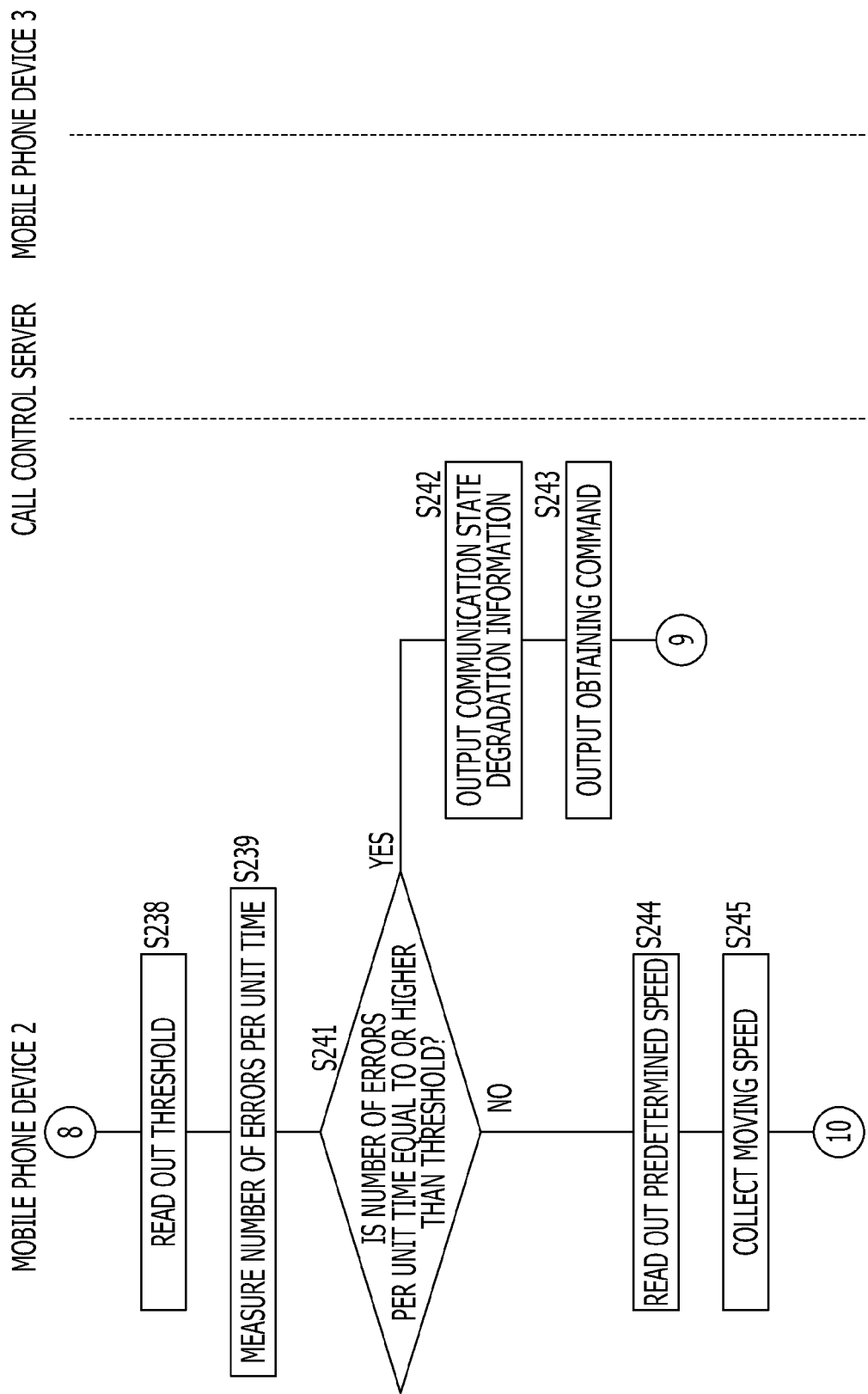

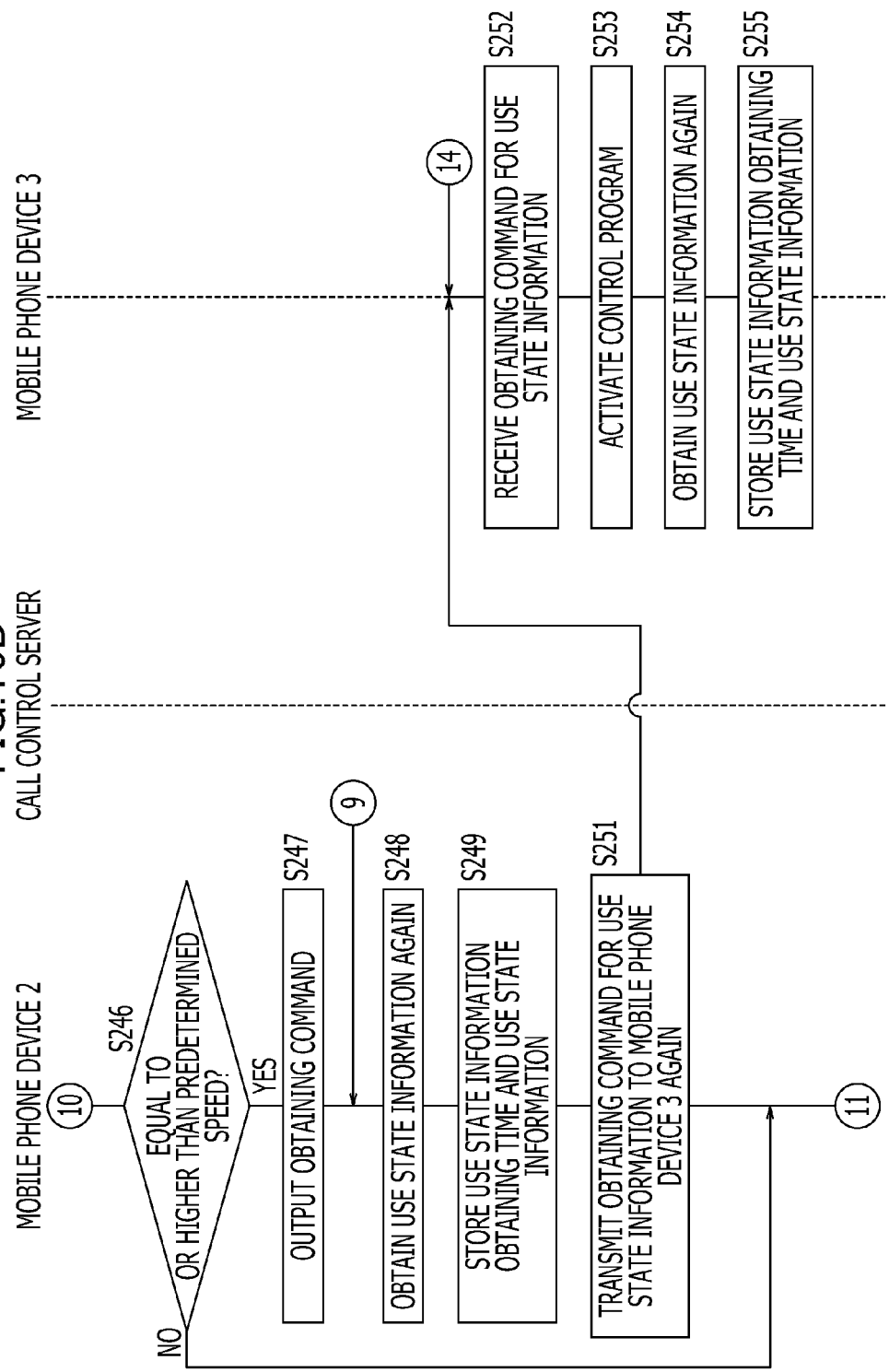

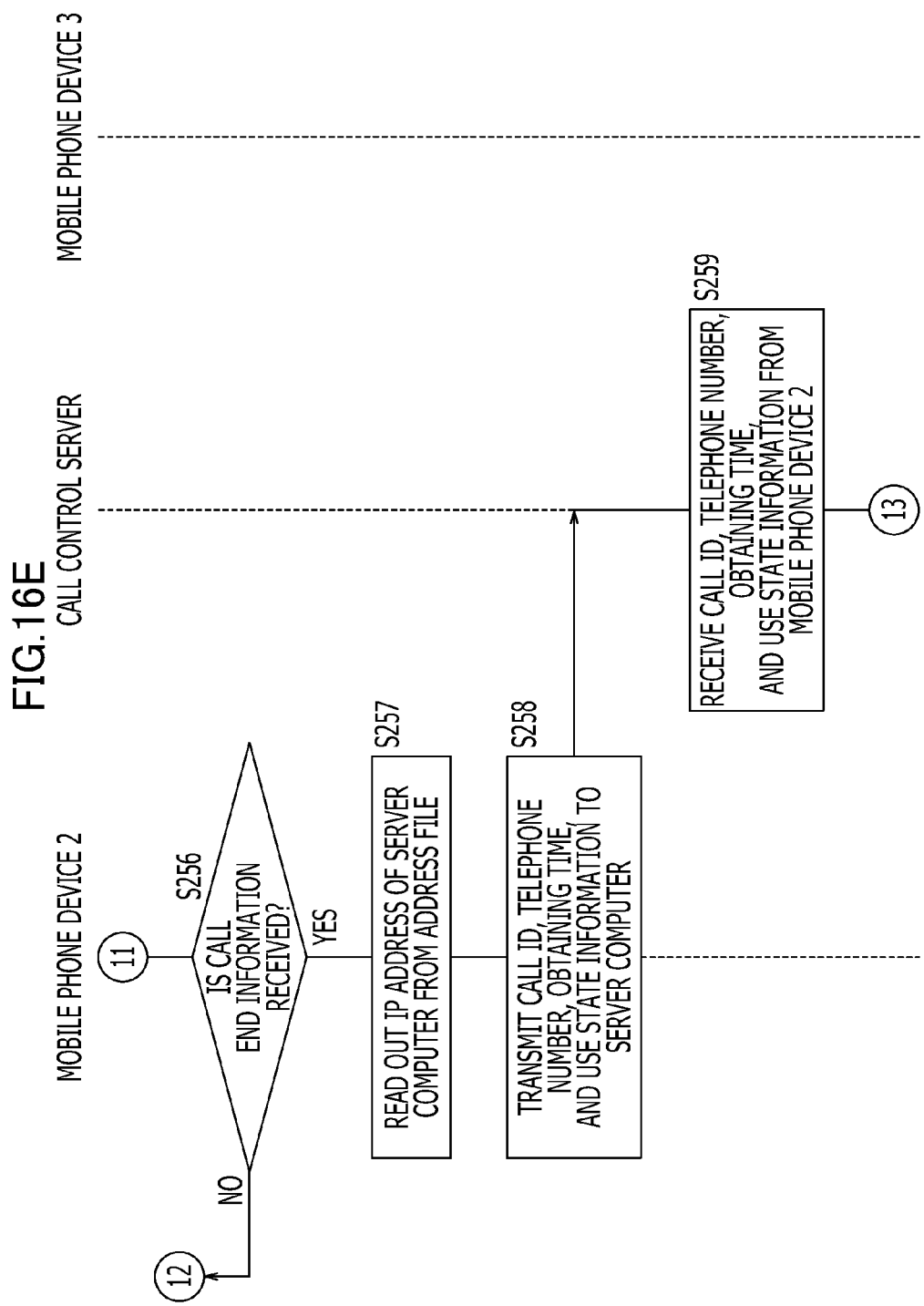

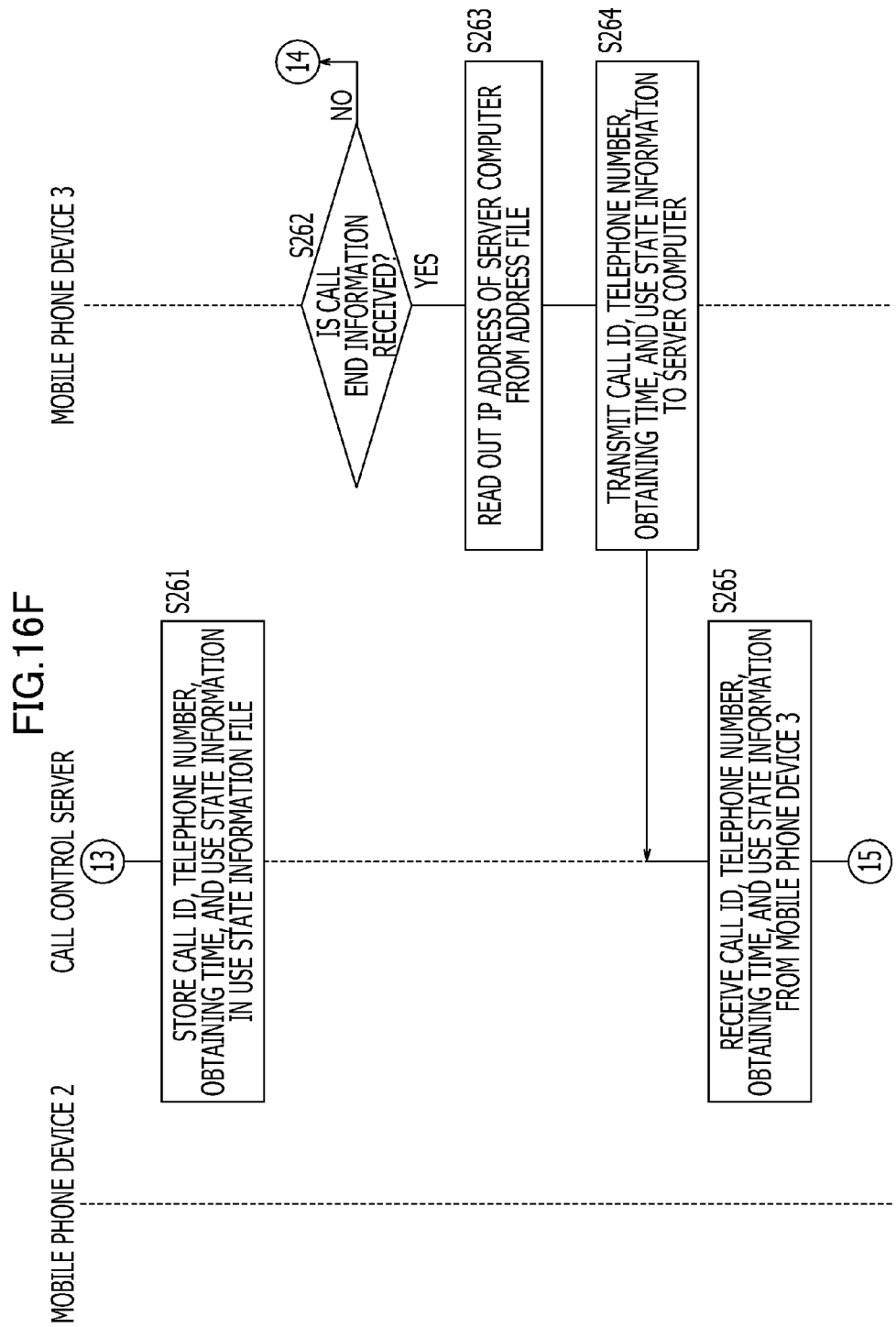

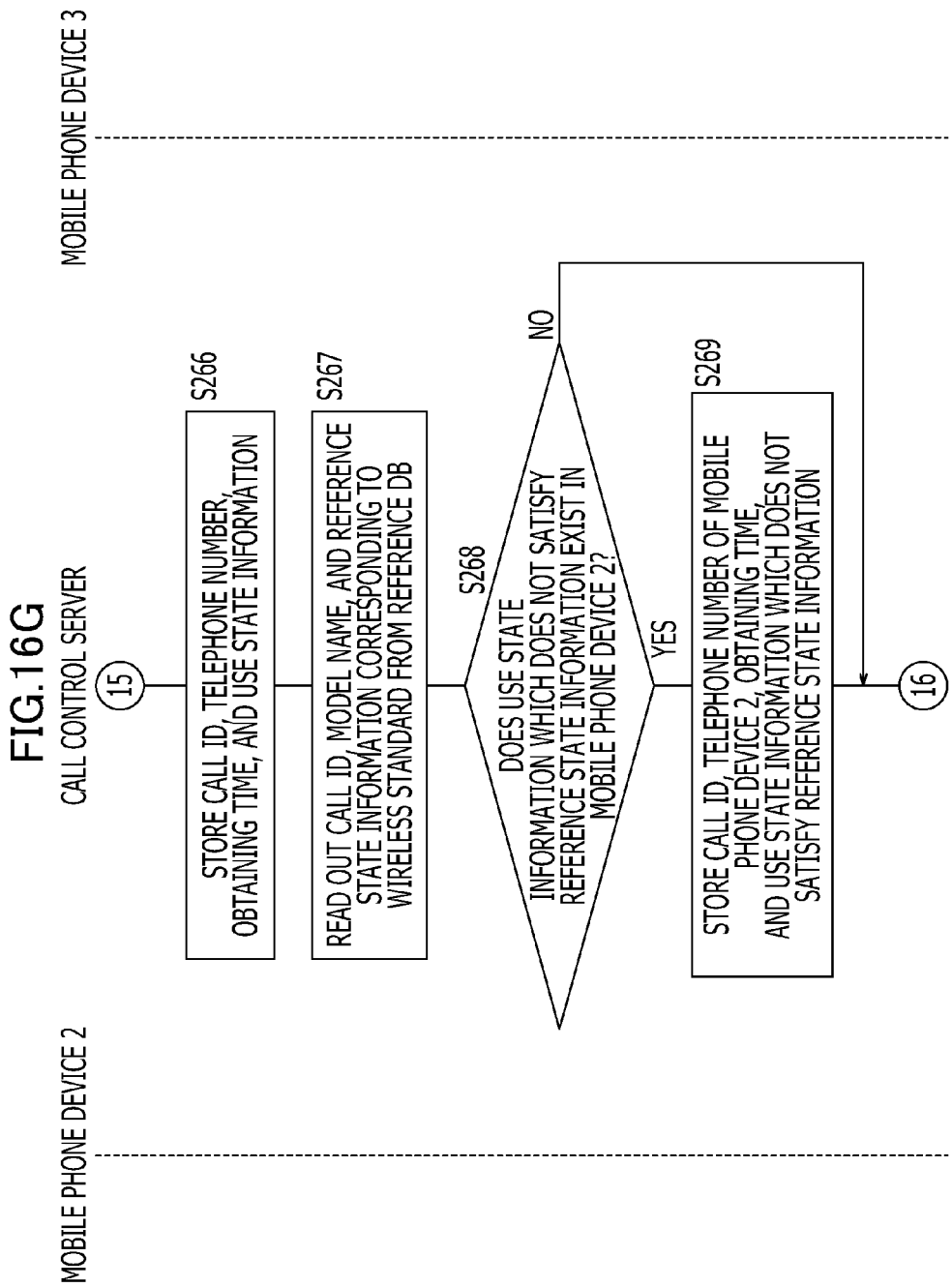

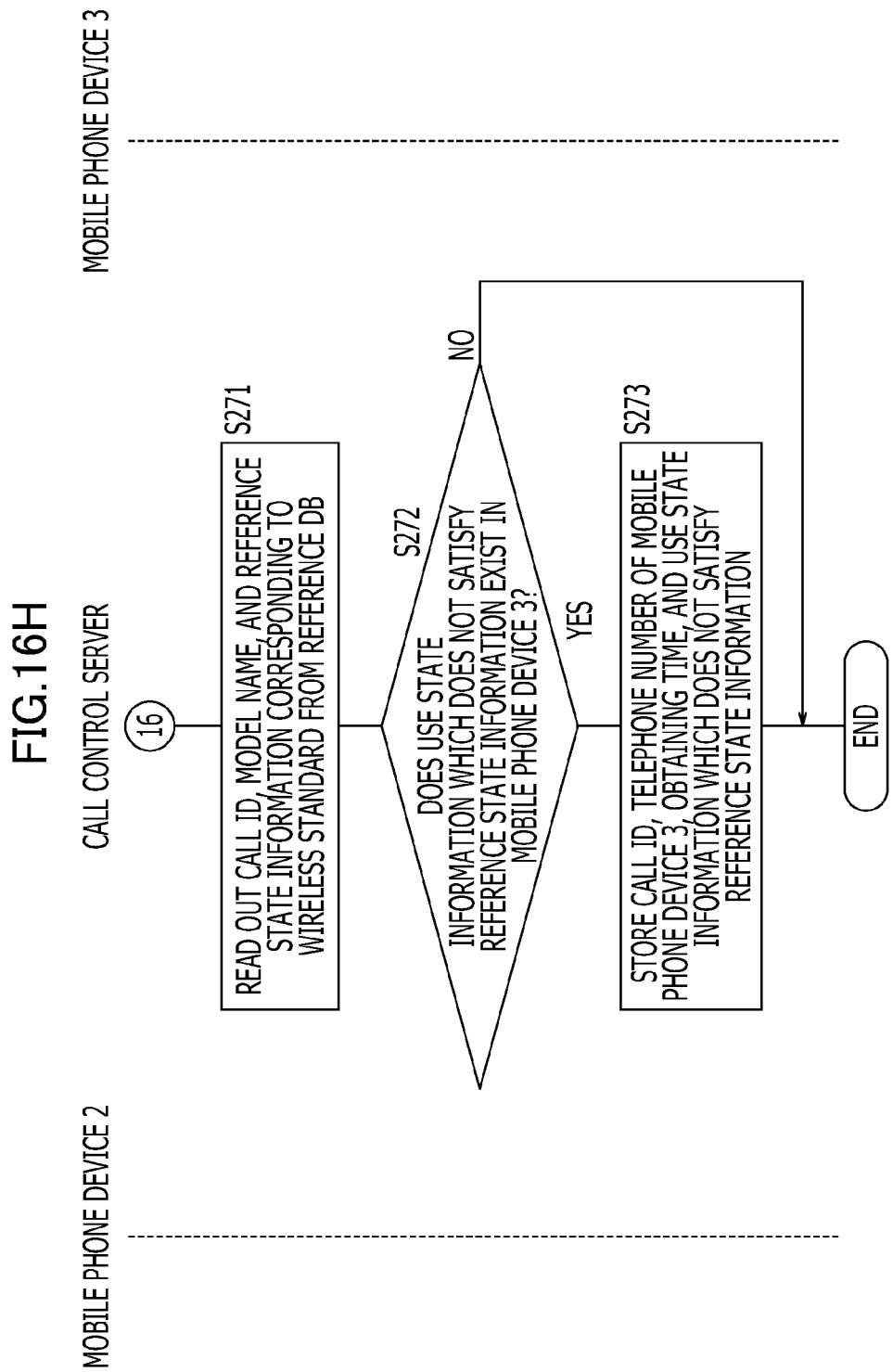

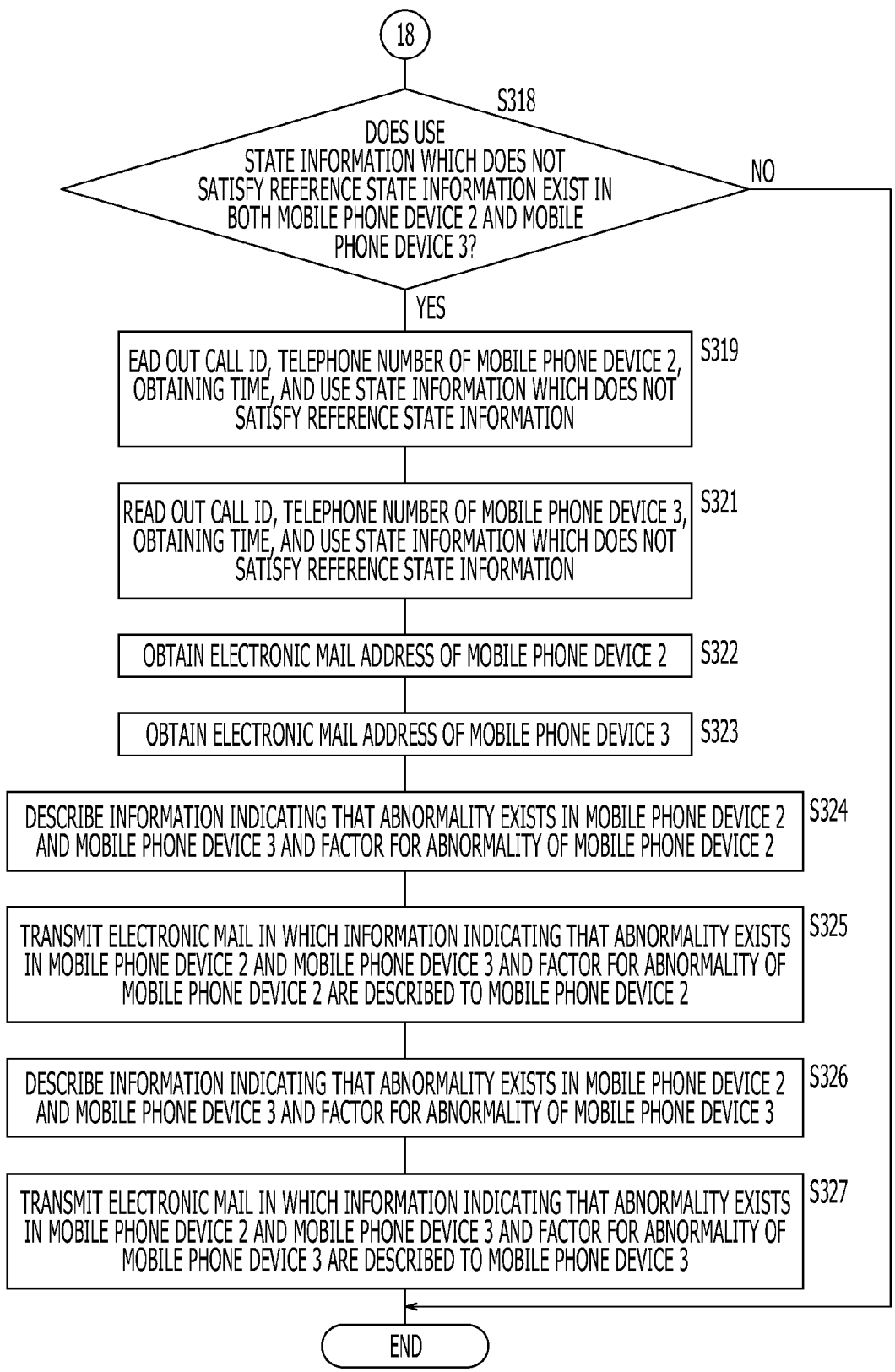

COMMUNICATION DEVICE, COMMUNICATION SYSTEM, AND COMMUNICATION METHOD

CROSS-REFERENCE TO RELATED APPLICATIONS

This application is based upon and claims the benefit of priority of the prior Japanese Patent Application No. 2009-144392, filed on Jun. 17, 2009, the entire contents of which are incorporated herein by reference.

FIELD

The embodiments discussed herein are related to a communication device, a communication system, and a communication method.

BACKGROUND

In a communication device utilizing a wireless communication such as a mobile phone or a PDA (Personal Digital Assistant), a call quality may be abnormal in some cases because of numerous factors. For that reason, various methods are proposed to keep the quality at the time of the call. According to Japanese Patent Application Laid-open Publication No. 2007-166100, a wireless terminal includes: an antenna section 1 for receiving a wireless signal; an RF section 2 for converting the wireless signal into a baseband signal; a baseband processing section 3 for detecting errors when decoding the baseband signal to produce coded data; a multimedia processing section 4 for detecting errors when decoding the coded data to produce received data; and a communication quality determination section 5 for determining that uplink communication quality of the communication partner terminal is deteriorated on the basis of a result of the error detection by the multimedia processing section 4 is disclosed. In addition, according to Japanese Patent Application Laid-open Publication No. 2008-160754, In a mobile unit 10, each time user quality information caused by user operation or movement is acquired, the user quality information is stored in a measured result storage section 113 and the stored user quality information is transmitted to a mobile unit log management center 20 in prescribed timing. In the mobile unit log management center 20, user quality information from the mobile unit 10 is received and managed as a mobile unit log, the mobile unit log is analyzed and if there is a quality deteriorated service area on the basis of the analyzed result, relief measures are instructed to an operation system controlling base stations in the service area. Thus, precise services that can not be attained by radio quality used for service area quality investigations of RSCP, Ec/No, BLER or the like can be provided to users is disclosed.

SUMMARY

A communication device includes: an obtaining unit that obtains use state information of the communication device during a call with another communication device; and a transmission unit that transmits an obtaining command for use state information of the other communication device to the other communication device and the use state information obtained to an external part.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 5 depicts an example record layout of a registration DB;
FIG. 6 depicts an example record layout of a history DB;
FIG. 8 depicts an example record layout of a reference DB;
FIG. 9 depicts an example record layout of a use state file;
FIGS. 10A-10B are example flow charts of a communication process among the mobile phone devices and the call control server;
FIGS. 11A-11E are example flow charts of an obtaining process for use state information;
FIG. 13 depicts an example record layout of a prediction file;
FIG. 15 depicts an example record layout of the use state file according to a third embodiment;
FIGS. 16A-16H are example flow charts of a use state information obtaining process;
FIGS. 17A-17C are example flow charts of a process when an abnormality notification is performed.

DESCRIPTION OF EMBODIMENTS

According to the related art methods, factors for the abnormality in the call quality other than the communication quality may not be identified. Also, it is not possible to determine in which one of a call origin and a call destination such a factor for the abnormality exists.

First Embodiment

Figure 1:
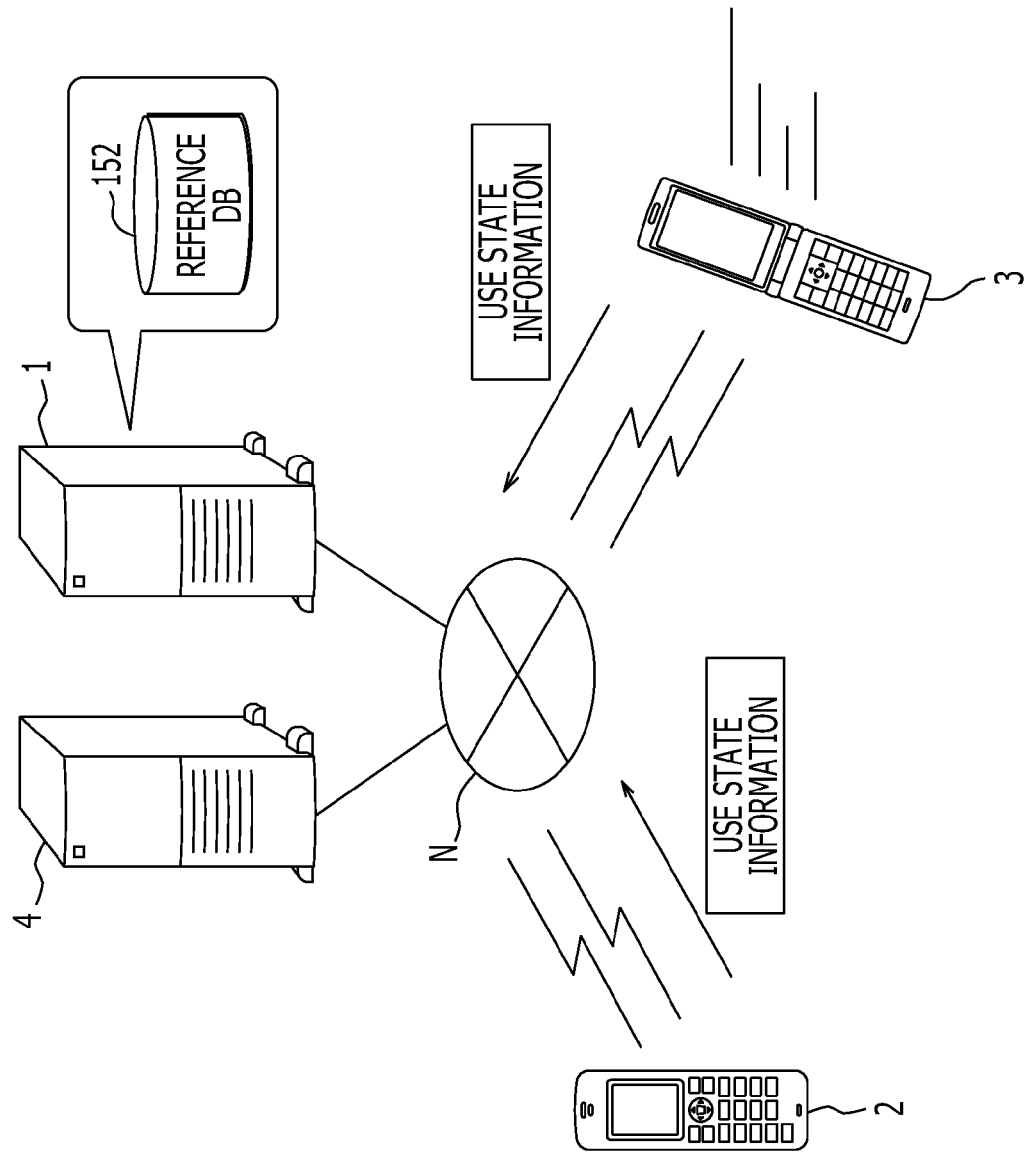
FIG. 1 depicts an example of a communication system.

Hereinafter, embodiments will be described with reference to the drawings. FIG. 1 depicts an example of a communication system. The communication system includes a server computer 1, a call control server computer 4, a communication device 2, a communication device 3, and the like. The server computer 1, the call control server computer 4, the communication device 2, and the communication device 3 are mutually connected via a communication network N including the internet, a mobile phone network, and the like, and transmission and reception of information are carried out. The communication device 2 and the communication device 3 are composed of a mobile phone, a PDA, a laptop personal computer, a game machine having a communication function, or the like. According to the present embodiment, a description will be given by exemplifying a case in which the communication device 2 and the communication device 3 are applied to the mobile phone device 2 and the mobile phone device 3.

The mobile phone devices 2 and 3 are composed, for example, of an IP (Internet Protocol) mobile phone device using a wireless LAN (Local Area Network) or a mobile phone device using a communication system such as CDMA (Code Division Multiple Access), W-CDMA (Wideband CDMA), or TDMA (Time DMA). Other than those above, the mobile phone devices 2 and the mobile phone devices 3 may be composed of a mobile phone device using PHS (Personal Handyphone System). According to the present embodiment, a description will be given by exemplifying a case in which the IP mobile phone devices are used for the mobile phone devices 2 and 3.

The call control server computer (hereinafter, which will be referred to as call control server) 4 connected via the communication network N to the mobile phone device 2 and the mobile phone device 3 carries out a connection control and a termination control between the mobile phone device 3 at the call destination and the mobile phone device 2 on the basis of telephone numbers. The server computer 1 compares use state information transmitted from the mobile phone device 2 and the mobile phone device 3 with information stored in a reference database (hereinafter, which will be referred to as DB) 152 to determine whether or not an abnormality exists.

Hereinafter, the outline will be described. The call control server 4 establishes a communication between the mobile phone device 2 and the mobile phone device 3. The mobile phone device 2 obtains the use state information indicating a use state of the mobile phone device including a movement speed of the mobile phone device 2 itself under a certain condition during the call, a reception intensity, or the like. In addition, to the mobile phone device 3, the mobile phone device 2 transmits an obtaining command for the use state information of the mobile phone device 3 itself. In a case where the mobile phone device 3 receives the obtaining command, the mobile phone device 3 obtains its own use state information. FIG. 1 depicts an example in which the mobile phone device 3 is on the move and a communication state is deteriorated. In this case, the use state information of the mobile phone device 3 includes information on a moving speed of the mobile phone device 3 (3 m/s or the like).

After the call, the mobile phone device 2 transmits the use state information of the mobile phone device 2 itself to the server computer 1. Also, the mobile phone device 3 transmits the use state information of the mobile phone device 3 itself to the server computer 1. The server computer 1 receives the use state information transmitted from the mobile phone devices 2 and 3. The server computer 1 has the reference DB 152 storing reference state information which serves as a reference for determining whether or not an abnormality exists in the use states of the mobile phone devices 2 and 3. The server computer 1 compares the reference state information of the reference DB 152 with the use state information transmitted from the mobile phone device 2 to determine whether or not an abnormality exists.

Similarly, the server computer 1 compares the reference state information of the reference DB 152 with the use state information transmitted from the mobile phone device 3 to determine whether or not an abnormality exists. For example, the reference DB 152 stores 2 m/s or lower as a moving speed related to the reference state. In a case where the moving speed related to the use state information of the mobile phone device 3 is 3 m/s, as the moving speed exceeds 2 m/s as the moving speed related to the reference state, it is determined that the abnormality exists. Hereinafter, a detail thereof will be described.

Figure 2:
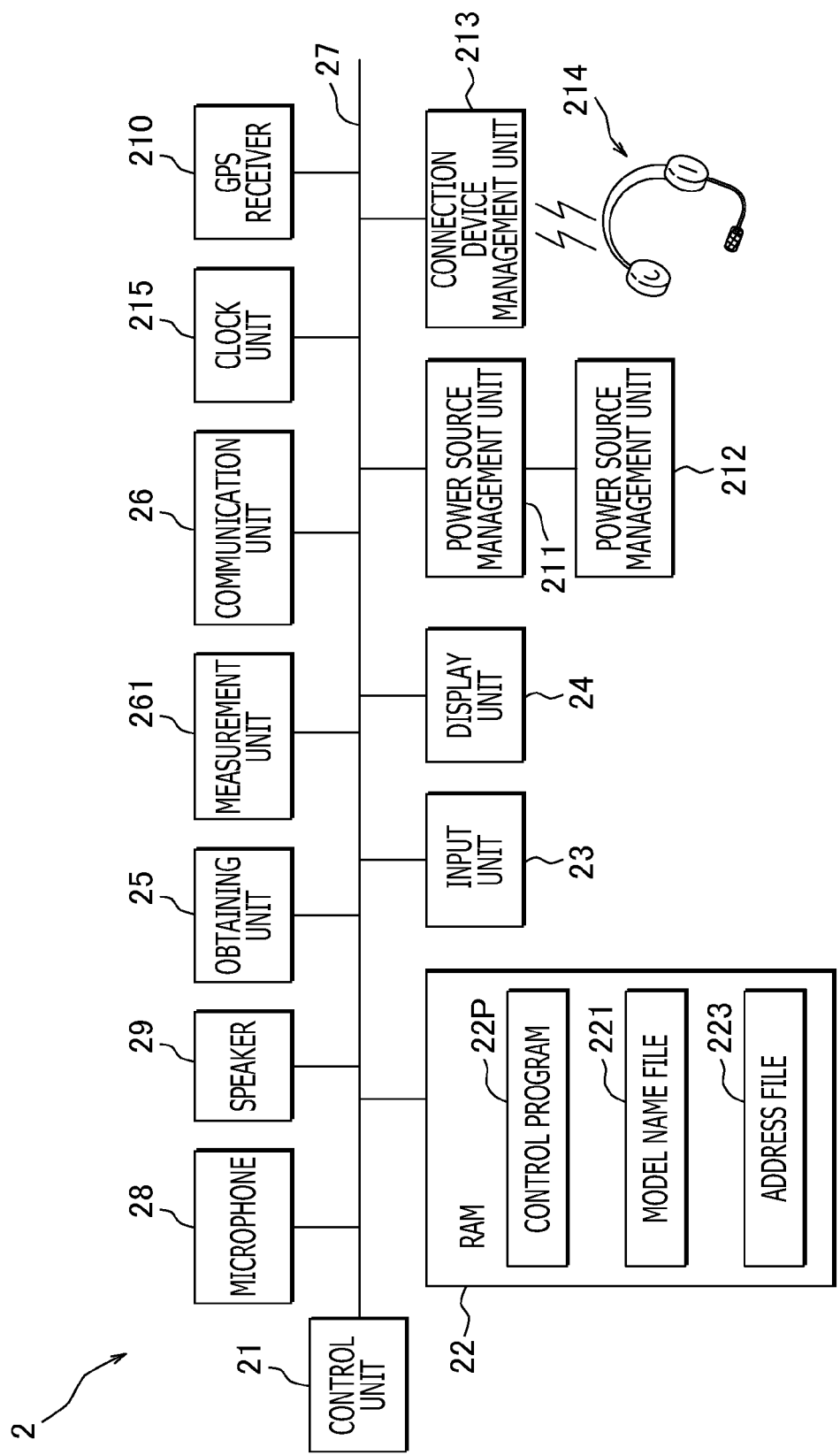
FIG. 2 depicts an example hardware configuration of a mobile phone device.

FIG. 2 depicts an example hardware configuration of a mobile phone device 2. The mobile phone device 2 includes a control unit 21, a RAM (Random Access Memory) 22, an input unit 23, a display unit 24, an obtaining unit 25, a communication unit 26, a measurement unit 261, a microphone 28, a speaker 29, and a GPS (Global Positioning System) receiver 210. Other than those above, the mobile phone device 2 includes a clock unit 215, a power source management unit 211, a battery 212, a connection device management unit 213, and the like. The control unit 21 such as a CPU (Central Processing Unit) is connected to respective hardware units of the mobile phone device 2 via a bus 27 to control those hardware units and also executes various software functions while following a control program 22P stored in the RAM 22.

The display unit 24 is composed, for example, of a liquid crystal display, an organic EL (electroluminescence) display, or the like. The display unit 24 displays display information output while following an instruction of the control unit 21. The input unit 23 is composed of push buttons or the like. Information input from the input unit 23 is output to the control unit 21. It is to be understood that the input unit 23 may be layered on the display unit 24 like a touch panel. The speaker 29 amplifies audio data or an audio signal related to audio input from the microphone 28 to be output. The microphone 28 converts an audio signal input from an external part into an electronic signal. The electronic signal after the conversion is converted by an A/D converter which is not depicted into digital data to be output to the control unit 21. The clock unit 215 outputs a time to the control unit 21.

The communication unit 26 performs transmission and reception of various pieces of data such as the audio data, the use state information, and the image data. For the communication unit 26, for example, a wireless LAN card based on a standard such as IEEE (Institute of Electrical and Electronics Engineers) 802.11a, b, or g is used. The communication unit 26 performs the transmission and the reception of the information via an access point such as a wireless LAN router (not depicted) between the call control server 4, the mobile phone device 3, and the server computer 1. The communication unit 26 transmits the information while following a control of the control unit 21 and outputs the received information to the control unit 21. The battery 212 is composed of a lithium-ion battery or the like. The power source management unit 211 performs electric power supply control and stop control of the battery 212 to the mobile phone device 2.

Also, the power source management unit 211 measures the remaining amount of the battery 212. The connection device management unit 213 controls a connection device 214 for transmitting and receiving the audio data or the like with the mobile phone device 2 by way of a communication based on the Bluetooth (registered trademark) standard, an infrared communication, or a wired communication, for example. The connection device 214 is composed of, for example, an earphone microphone (head set), an earphone, a microphone, a hands-free microphone for an automobile, a speaker, a camera, or the like. It is to be understood that the connection device 214 and the connection device management unit 213 may also be connected in a wired manner by using a USB (Universal Serial Bus) cable or the like. According to the present embodiment, a description will be given by exemplifying a case in which the earphone microphone 214 is used by the wireless communication based on the Bluetooth standard.

The connection device management unit 213 performs transmission and reception of the audio data with the earphone microphone 214.

The GPS receiver 210 receives radio waves from an artificial satellite (GPS satellite) to measure a current position and a current orientation of the mobile phone device 2. The GPS receiver 210 measures a change of the current position per unit time to calculate a moving speed of the mobile phone device 2. In side the RAM 22, a model name file 221 and an address file 223 are stored. The model name file 221 stores a model name of the mobile phone device 2 or a serial number such as a MAC (Media Access Control) address for identifying the model name. The address file 223 stores IP addresses or the like of the call control server 4 and the server computer 1.

The measurement unit 261 measures a communication state in the communication unit 26. The measurement unit 261 may function by way of an IC (Integrated Circuit) and also may function as LAN analyzer software while the control unit 21 executes the control program 22P. The measurement unit 261 monitors packets transmitted and received in the communication unit 26 to measure a communication state such as the number of errors or the number of collisions. The measurement unit 261 outputs information indicating the communication state is degraded to the control unit 21 in a case where the measured number of errors or the measured number of collisions exceed a specified condition. It is to be understood that the measurement of the communication state is merely an example and is not limited to this. For example, in a case where the communication unit 26 receives a high frequency wireless signal via an antenna, the high frequency wireless signal is converted into a low frequency baseband signal. The measurement unit 261 may decode this converted baseband to measure the communication state in accordance with an error detection result at the time of the decoding.

Other than those above, the measurement unit 261 may analyze the audio data received by the communication unit 26 through a frequency analysis or the like to measure the communication state. It is to be understood that according to the present embodiment, the description is given by exemplifying the case in which the degradation in the communication state is measured in accordance with the number of errors of the packets per unit time (for example, the number of errors per second), in a case where the number of errors per unit time is high, the measurement unit 261 outputs the degradation in the communication state to the control unit 21. The control unit 21 outputs the information indicating the degradation in the communication state to the obtaining unit 25. In a case where the information indicating the degradation in the communication state is accepted, the obtaining unit 25 obtains the use state information.

The obtaining unit 25 obtains the use state information indicating in which state the hardware or software of the mobile phone device is used. The obtaining unit 25 may function by way of the IC and also function as the software while the control unit 21 executes the control program 22P. To be more specific, the obtaining unit 25 obtains a wireless standard used by the communication unit 26 as the use state information. For example, IEEE802.11a, IEEE802.11b, and IEEE802.11g which is Wi-Fi (registered trademark) standard or IEEE802.16a or the like which is WiMAX (registered trademark) standard. Other than those above, a communication standard such as CDMA, W-CDMA, GSM (Global System for Mobile Communications) may be obtained as the use state information.

Also, the obtaining unit 25 refers to the model name file 221 and obtains the model name as the use state information. Through an insertion of a SIM (Subscriber Identity Module) card or a UIM (User Identity Module) card which is not depicted, the user may use a plurality of mobile phone devices 2, and the model names are obtained as the use state information. The obtaining unit 25 obtains the remaining amount of the battery 212 from the power source management unit 211. Depending on a model, the battery remaining amount affects the communication state, and therefore the obtaining unit 25 obtains the battery remaining amount of the battery 212 as the use state information. According to the present embodiment, as an example, the description is given while it is set that the battery remaining amount has five stages from 1 to 5, and the larger number indicates the larger remaining amount. Also, the obtaining unit 25 may obtain a type and a version of an OS (Operating System) which is not depicted of the mobile phone device 2 stored in the RAM 22, a browser, or IP telephone software, or the like as the use state information. It is to be understood that the control unit 21 refers to the output of the clock unit 215 and stores a time when the obtaining unit 25 obtains the use state information.

The obtaining unit 25 obtains a reception intensity between the communication unit 26 and the access point as the use state information. The communication unit 26 measures the reception intensity fluctuating in accordance with a distance to the access point or the like, and the obtaining unit 25 obtains this measured reception intensity. It is to be understood that, the description is given as an example while it is set that the reception intensity has five stages from 1 to 5, and the larger number indicates the more satisfactory reception intensity. The obtaining unit 25 obtains information on the access point at which the call is started and the access point from the communication unit 26 at the time of the obtaining. Then, the obtaining unit 25 obtains information as to whether or not the access point at which the call is started is changed because of the movement to another access point as the use state information. The change of the access point is determined, for example, on the basis of BSSID (Basic Service Set Identifier). Also, instead of the access point, a state may be obtained as to whether or not a base station is changed. In this case, the use state information is obtained as to whether or not the change occurs by referring to a base station ID.

The obtaining unit 25 obtains information indicating whether or not the earphone microphone 214 is used from the connection device management unit 213 as the use state information. In a case where the transmission and reception of the information are performed with the earphone microphone 214, the connection device management unit 213 outputs information indicating that the earphone microphone 214 is used to the obtaining unit 25, and in a case where the transmission and reception are performed, the connection device management unit 213 outputs information indicating that the earphone microphone 214 is not used to the obtaining unit 25. The obtaining unit 25 obtains the moving speed of the mobile phone device 2 calculated by the GPS receiver 210 as the use state information. It is to be understood that the above-mentioned pieces of use state information are examples, and in addition to those above, for example, information on a processing speed of the CPU in the control unit 21, noise input from the microphone 28, a temperature output from a temperature sensor which is not depicted, and the like may be utilized as the use state information. It is to be understood that it is not necessary to use all the pieces of use state information described above, and one or plural pieces of use state information may be used as appropriate.

Figure 3:
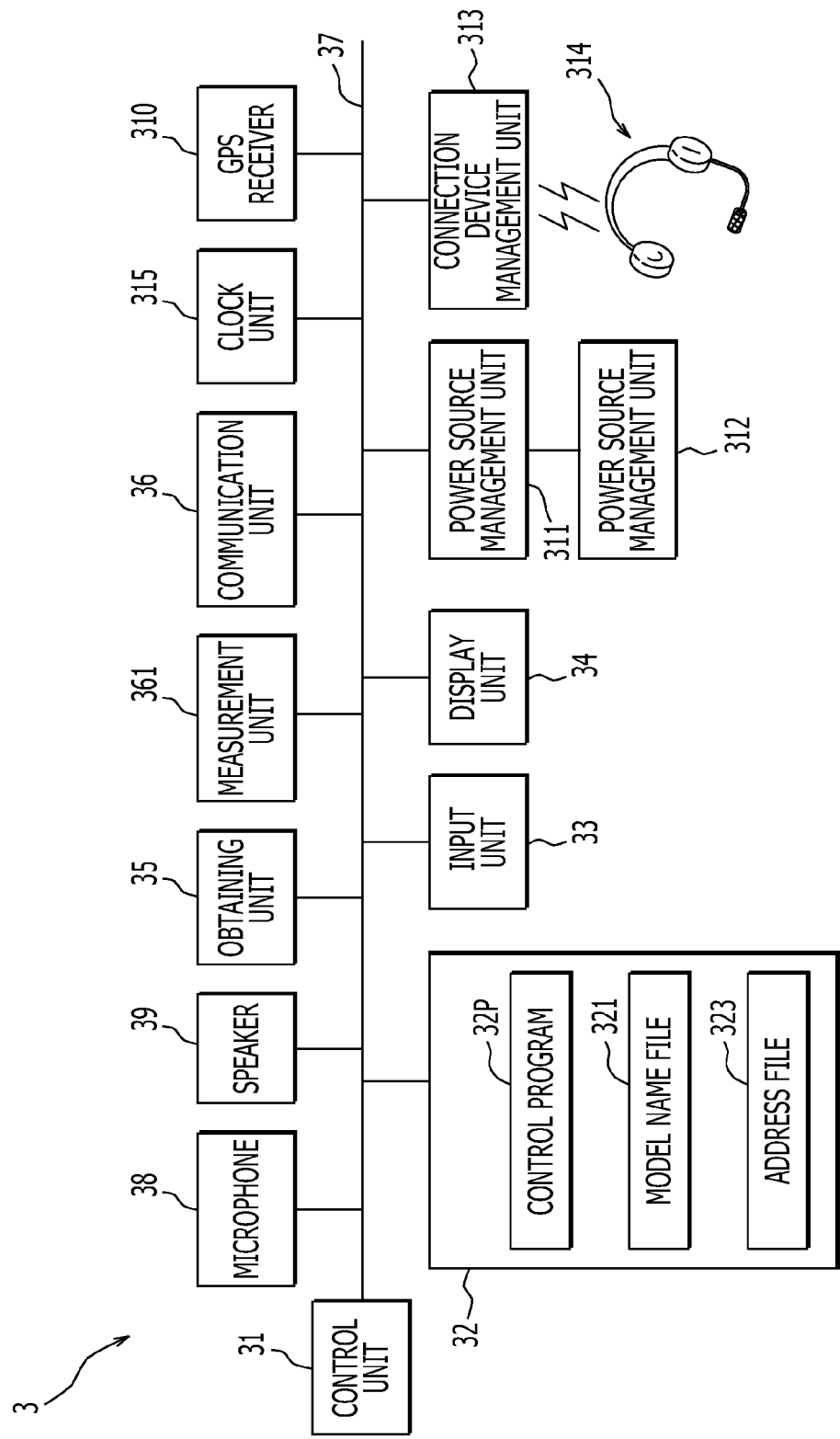
FIG. 3 depicts an example hardware configuration of another mobile phone device.
Figure 4:
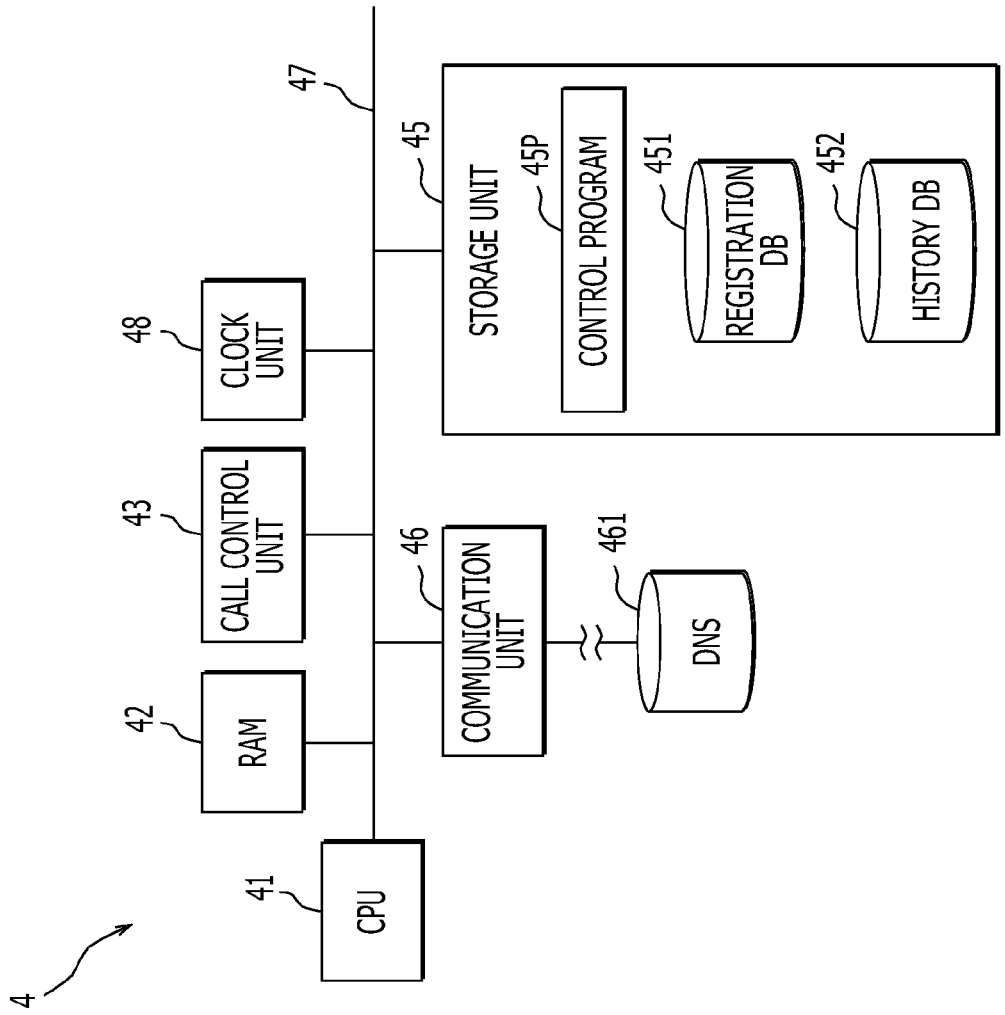
FIG. 4 depicts an example hardware configuration of a call control server.

FIG. 3 depicts an example hardware configuration of another mobile phone device 3. The mobile phone device 3 is similar to the mobile phone device 2. Only differences of reference symbols are illustrated, and a detailed description thereof will be omitted. FIG. 4 depicts an example hardware configuration of a call control server 4. The call control server 4 includes a CPU 41, a RAM 42, a call control unit 43, a storage unit 45, the communication unit 46, a clock unit 48, and the like. The CPU 41 is connected to respective hardware units of the call control server 4 via a bus 47 to control those hardware units and also executes various software functions while following a control program 45P stored in the RAM 42. The communication unit 46 includes a router, a VoIP (Voice over Internet Protocol) adapter, and the like and is connected via the communication network N to the mobile phone devices 2 and 3, the server computer 1, and DNS (Domain Name Server) to perform transmission and reception of information.

The clock unit 48 outputs a time to the CPU 41. The call control unit 43 receives call control messages respectively from an outgoing side and an incoming side. Also, the call control server 4 controls a sequence of connection request, calling, response, conversation, and termination. The storage unit 45 is composed of a hard disk, a large-capacity memory, or the like and configured to store the control program 45P, a registration DB 451, and a history DB 452. The registration DB 451 stores telephone numbers, URIs (Uniform Resource Identifiers), and the like while being associated with user IDs of the mobile phone devices 2 and 3 which perform the communication.

FIG. 5 depicts an example record layout of a registration DB 451. The registration DB 451 includes a user ID field, a telephone number field, and a URI field. The user IDs are unique numbers for identifying the users of the mobile phone devices 2 and 3. In the present example, the description is given while the user ID of the mobile phone device 2 is set as "002", and the user ID of the mobile phone device 3 is set as "003". In the telephone number field, the telephone number is stored while being associated with the user ID. In the URI field, the URI which is the address is stored while being associated with the user ID.

In a case where the mobile phone device 2 makes a call to the mobile phone device 3, the call control unit 43 refers to the registration DB 451 and searches for the URI of the mobile phone device 3 from the telephone number of the mobile phone device 3 which is the call destination. The call control unit 43 obtains the IP address of the mobile phone device 3 corresponding to the URI searched for by using a DNS 461. The call control unit 43 manages the state of the respective mobile phone devices 2 and 3 such as busy, available, or calling. After it is confirmed that the mobile phone device 3 at the call destination is not during the call, the call control unit 43 transfers the call control packet received from the mobile phone device 2 to the IP address at the call destination. The call control unit 43 stores a communication state between the mobile phone device 2 and the mobile phone device 3 in the history DB 452.

FIG. 6 depicts an example record layout of a history DB 452. The history DB 452 stores various pieces of information such as an outgoing side telephone number while being associated with unique identification information for identifying the call (hereinafter, which will be referred to as call ID). The history DB 452 includes a call ID field, an outgoing side telephone number field, a reception side telephone number field, a call start time field, a call end time field, and the like. In the transmitter side telephone number field, the telephone number on the outgoing side is stored while being associated with the call ID. Similarly, in the reception side telephone number field, the telephone number on the receiving side is stored while being associated with the call ID. In the call start time field, the time output from the clock unit 48 at the time of the call start is stored while being associated with the call ID.

In the call end time field, the time output from the clock unit 48 at the time of the call end is stored while being associated with the call ID. The call control unit 43 refers to the registration DB 451 at the time of the call start, the call end, and the like between the mobile phone devices 2 and 3 and stores the above-mentioned information in the history DB 452. It is to be understood that the data layout described according to the present embodiment is merely an example, and the configuration is not limited to this. As long as the association is established between the pieces of data, the data may be freely arranged in accordance with the design. Also, the description has been given while exemplifying the case in which the registration DB 451 and the history DB 452 are stored in the storage unit 45 of the call control server 4, but the configuration is not limited to this. For example, the registration DB 451 and the history DB 452 may be stored in an external DB server (not depicted) connected via the communication unit 46 to carry out the read and write of the data as circumstances demand.

Figure 7:
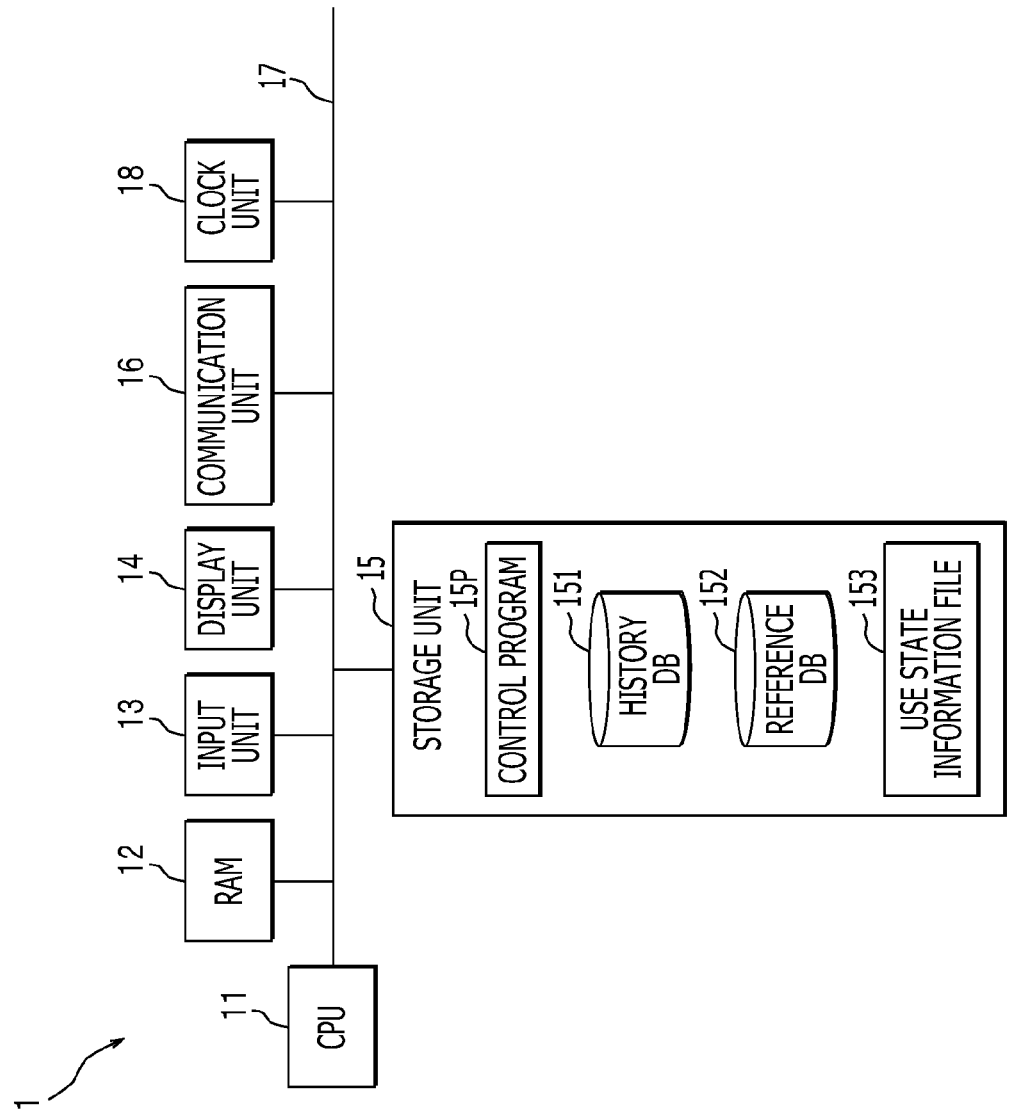
FIG. 7 depicts an example hardware configuration of a server computer.
Figure 11A:
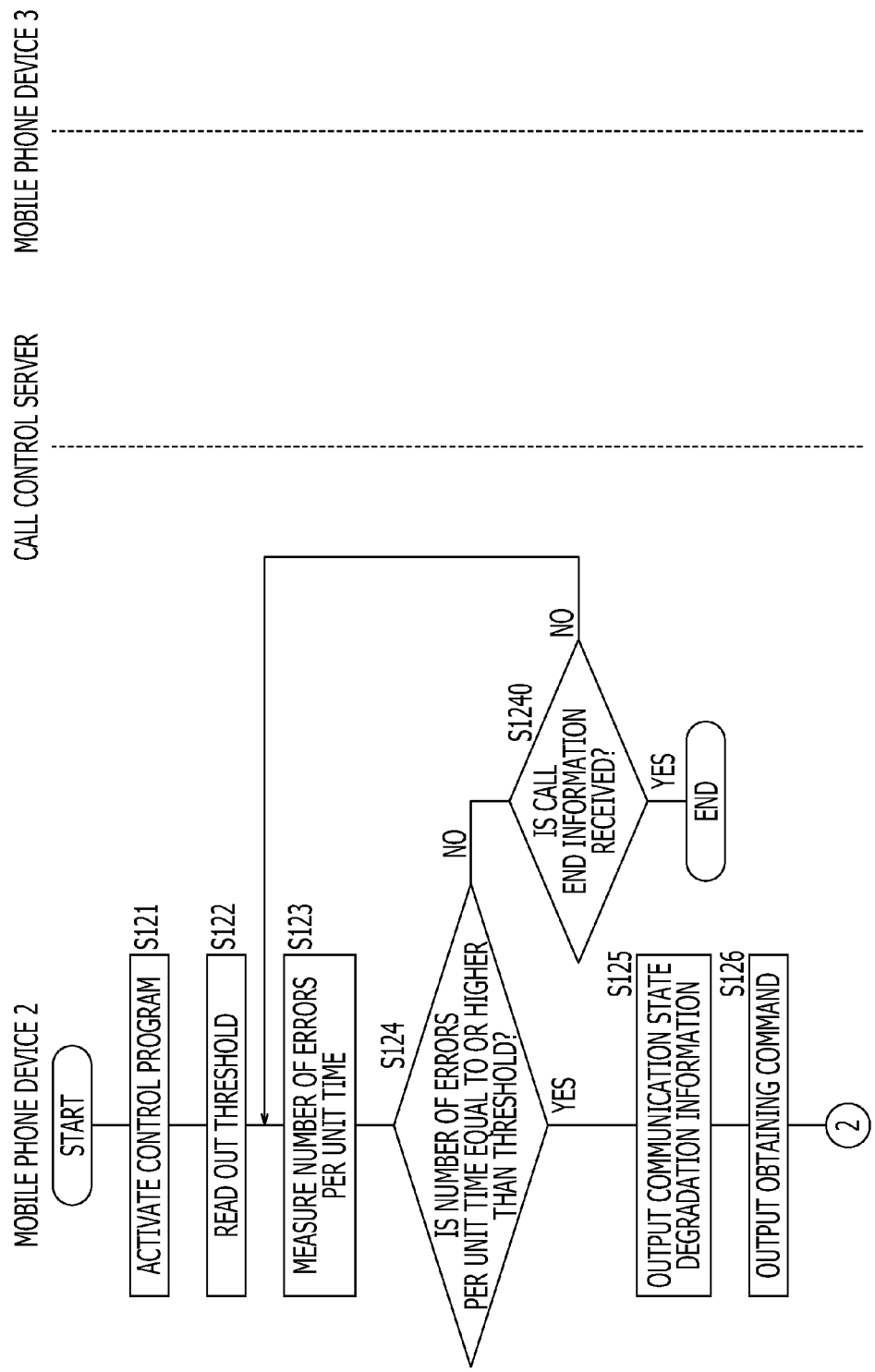
Figure 11B:
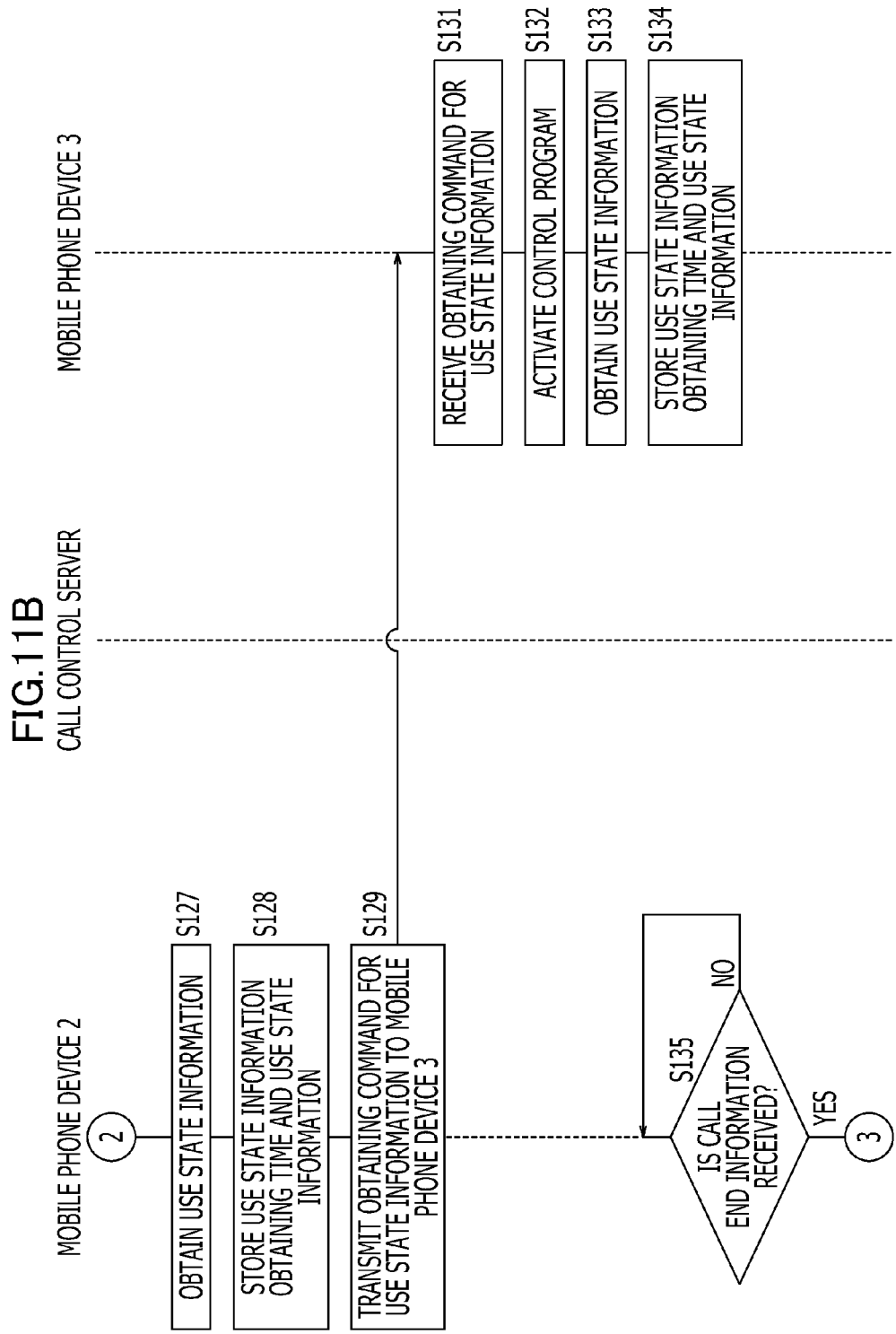
Figure 11C:
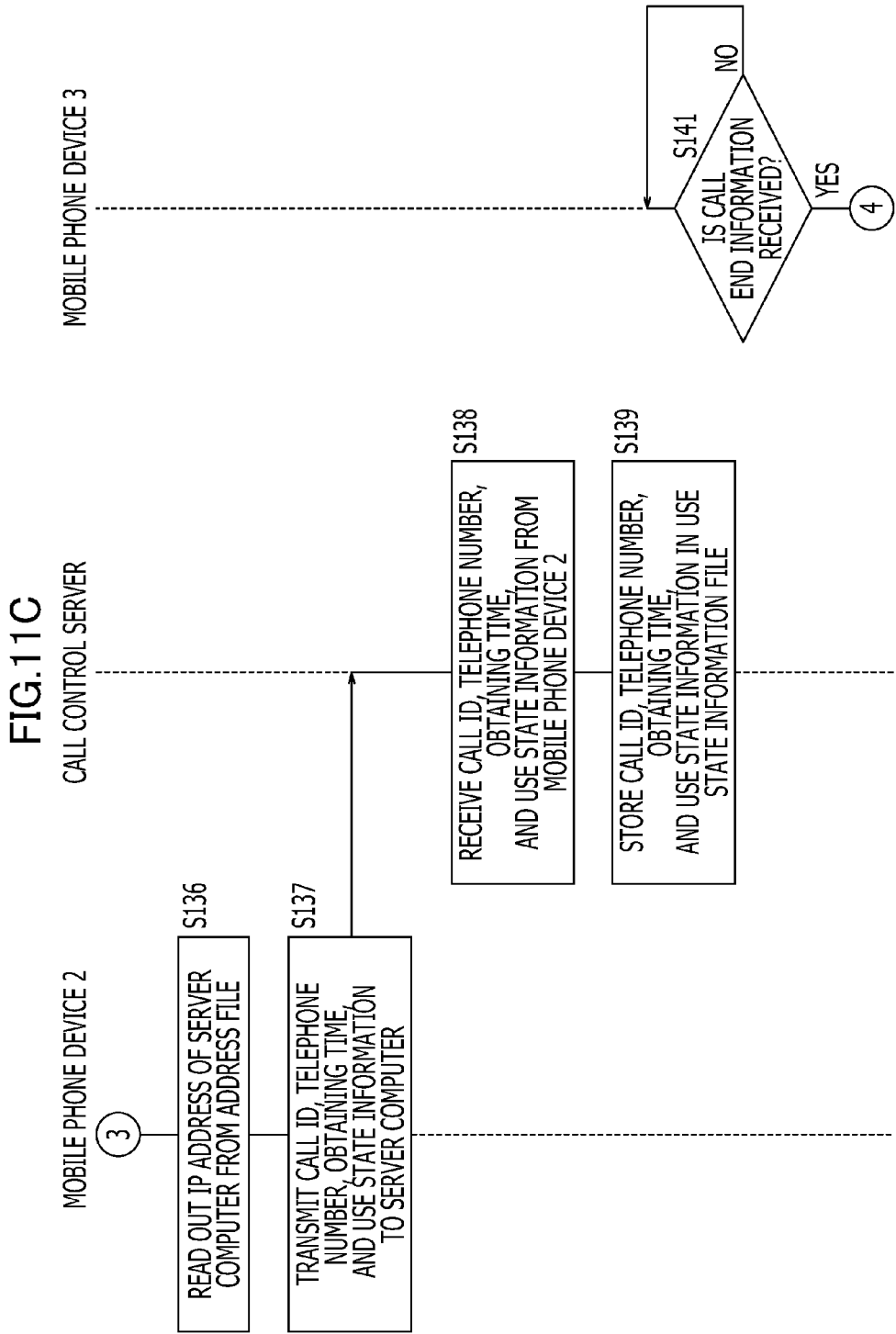

FIG. 7 depicts an example hardware configuration of a server computer 1. The server computer 1 includes a CPU 11, a RAM 12, an input unit 13, a display unit 14, a storage unit 15, a communication unit 16, a clock unit 18, and the like. The CPU 11 is connected to respective hardware units of the server computer 1 via a bus 17 to control those hardware units and also executes various software functions while following a control program 15P stored in the storage unit 15.

The display unit 14 is composed, for example, of a liquid crystal display, an organic EL display, or the like. The display unit 14 displays display information output while following an instruction of the CPU 11. The input unit 13 is composed, for example, of a key board, a mouse, or the like. Information input from the input unit 13 is output to the CPU 11. The clock unit 18 outputs a time to the CPU 11. The communication unit 16 is composed of a LAN card or the like and configured to perform transmission and reception of information between the mobile phone device 2, the mobile phone device 3, and the call control server 4. It is to be understood that according to the present embodiment, the description is given by exemplifying the case in which the call control server 4 and the server computer 1 are separated, but the configuration is not limited to this. The call control server 4 and the server computer 1 may be used as an integral computer.

The storage unit 15 is composed of a hard disk or a large-capacity memory, in which the control program 15P, a history DB 151, the reference DB 152, a use state information file 153, and the like are stored. The history DB 151 stores substantially the same content as the history DB 452 which is stored in the call control server 4. The call control server 4 transmits the information on the call history stored in the history DB 452 periodically or each time the history DB 452 is updated to the server computer 1. The server computer 1 stores information on the received call history in the history DB 151. The reference DB 152 stores reference state information for determining the states of the mobile phone devices 2 and 3. In a case where the use state information transmitted from the mobile phone device 2 or the mobile phone device 3 satisfies the reference state information stored in the reference DB 152, the CPU 11 determines that the state is normal. In a case where the use state information transmitted from the mobile phone device 2 or the mobile phone device 3 does not satisfy the reference state information stored in the reference DB 152, the CPU 11 determines that the state is abnormal.

FIG. 8 depicts an example record layout of a reference DB 152. The reference DB 152 stores the reference state information for each model as the performance may vary in accordance with the model. According to the present embodiment, a description will be given by exemplifying a case in which a model A, a model B, and a model C exist as an example of the model name. Furthermore, the reference DB 152 stores the reference state information for each wireless standard as the performance may vary in accordance with the wireless standard. According to the present embodiment, as an example of the wireless standard, IEEE802.11a, IEEE802.11b, IEEE802.11g, and IEEE802.16a are exemplified for the description. FIG. 8 exemplifies a storage content in a case where the model name is the model A, and the wireless standard is IEEE802.11a.

The reference DB 152 includes a battery remaining amount field, an earphone microphone field, a reception intensity field, a change field of an access point, a moving speed field, and the like. In the battery remaining amount field, reference state information for indicating at about which level of the battery remaining amount it is determined that the state is normal is stored. In the present example, it is determined that the state is normal in a case where the battery remaining amount is 3 or higher. It is to be understood that depending on the model or the wireless standard, an influence caused by the battery remaining amount may also be small. In this case, as reference state information, it is stored that the battery remaining amount is, for example, 1 or higher. In the earphone microphone field, reference state information for determining whether or not the state is normal on the basis of whether or not the earphone microphone 214 is connected to the mobile phone device 2 is stored. In the example of FIG. 8, in a case where the earphone microphone 214 is "absent", it is determined that the state is normal.

In the reception intensity field, reference state information for indicating at about which level of the reception intensity it is determined that the state is normal is stored. In the example of FIG. 8, in a case where the reception intensity is 3 or higher, it is determined that the state is normal. In the change field of the access point, reference state information for indicating at about which level of the reception intensity for determining whether or not the state is normal depending on whether or not a change of the access point exists is stored. In the example of FIG. 8, in a case where the change of the access point does not exist, it is determined that the state is normal. In the moving speed field, a speed is stored as reference state information indicating at which moving speed of the mobile phone device 2 it is determined that the state is normal. In the present example, in a case where the speed is 2 m/s or lower, it is determined that the state is normal. It is to be understood that numeric examples illustrated in FIG. 8 are examples, and also the data layout is an example. The configurations are not limited to those above. The user may appropriately change the content stored in the reference DB 152 via the input unit 13.

FIG. 9 depicts an example record layout of a use state file 153. The use state information file 153 is stored while being associated with the call ID as the use state information transmitted from the mobile phone devices 2 and 3. The use state information file 153 includes a call ID field, a telephone number field, an obtaining time field, a model name field, a wireless standard field, a battery remaining amount field, an earphone microphone field, and an reception intensity field. Other than those above, the use state information file 153 includes an access point field, a moving speed field, and the like. In the call ID field, an ID for identifying a communication state between the mobile phone device 2 and the mobile phone device 3 is stored.

In the obtaining time field, a time at which the obtaining unit 25 of the mobile phone device 2 or an obtaining unit 35 of the mobile phone device 3 obtains the use state information is stored. In the model name field, model names of the mobile phone devices 2 and 3 are stored. In the wireless standard field, respective wireless standards for the mobile phone devices 2 and 3 are stored. In the present example, a part of the description is omitted like the wireless standard "11a". In the battery remaining amount field, respective battery remaining amounts of the mobile phone devices 2 and 3 are stored. It is to be understood that in the example of FIG. 9, an upper stage corresponds to the recoded of the use state information of the mobile phone device 2, and a lower stage corresponds to the recoded of the use state information of the mobile phone device 3. In the earphone microphone field, information as to whether or not the mobile phone devices 2 and 3 use the earphone microphone 214. In the present example, it is understood that the mobile phone device 2 does not use the earphone microphone 214, and the mobile phone device 3 uses the earphone microphone 214.

In the reception intensity field, the reception intensities in the mobile phone devices 2 and 3 are stored. In the access point field, information as to whether or not a change in the wireless LAN access point used by the mobile phone devices 2 and 3 exists is stored. In the present example, it is understood that the mobile phone device 2 uses an access point "AP1" from the call start time, and the mobile phone device 3 uses an access point "AP3" from the call start time. In the moving speed field, moving speeds of the mobile phone devices 2 and 3 are stored. In a case the call ID, the telephone number, and the obtaining time, as well as the use state information including the model name, the reception intensity, and the like are received from the mobile phone devices 2 and 3, the CPU 11 stores those above in the use state information file 153 as depicted in FIG. 9.

It is to be understood that according to the present embodiment, the description is given by exemplifying the case in which the reference DB 152, the use state information file 153, and the like are stored in the storage unit 15, but the configuration is not limited to this. For example, the reference DB 152, the use state information file 153, and the like may be stored in an external DB server (not depicted) connected via the communication unit 16, and read and write of the data may be carried out as appropriate. The CPU 11 compares the reference state information stored in the reference DB 152 with the use state information corresponding to the call ID stored in the use state information file 153 to determine whether or not an abnormality exists. In a case where the use state information does not satisfy the reference state information, the CPU 11 determines that the state is abnormal. In the example of FIG. 8, a state in which the earphone microphone 214 is "absent" is stored as the reference state information. In FIG. 9, as the use state information of the mobile phone device 2, a state in which the earphone microphone 214 is "absent" is stored, and as the use state information of the mobile phone device 3, a state in which the earphone microphone 214 is "present" is stored. In this case, the CPU 11 determines that an abnormality exists in the mobile phone device 3 identified by a call ID "001" and a telephone number "06-\*\*\*\*-4321". Similarly, the CPU 11 determines that the mobile phone device 2 identified by the call ID "001" and a telephone number "03-\*\*\*\*-5678" is normal.

Various software processings in the above-mentioned hardware will be described by using a flow chart. FIG. 10A and FIG. 10B are example flow charts of a communication process among the mobile phone devices 2 and 3 and the call control server 4. The control unit 21 of the mobile phone device 2 accepts the telephone number of the mobile phone device 3 (reception-side telephone number) from the input unit 23. In a case where the control unit 21 accepts the communication start request from the input unit 23, the telephone number of the mobile phone device 2 (outgoing side telephone number) stored in the RAM 22 and the reception-side telephone number and the communication start request thus accepted are transmitted to the call control server 4 (at S101). The CPU 41 of the call control server 4 receives the outgoing side telephone number, the reception-side telephone number, and the communication start request via the communication unit 46 (at S102).

The call control unit 43 reads out URIs corresponding to the outgoing side telephone number and the reception-side telephone number received from the registration DB 451 (at S103). The call control unit 43 obtains IP addresses on the outgoing side and the reception side from the DNS 461 (at S104). The call control unit 43 generates a new call ID (at S105). The call control unit 43 transmits the call ID and call start information to the mobile phone device 3 and the mobile phone device 2 (at S106). A control unit 31 of the mobile phone device 3 receives the call ID and the call start information via a communication unit 36 (at S107). The control unit 21 of the mobile phone device 2 receives the call ID and the call start information via the communication unit 26 (at S108).

The call control unit 43 stores the call ID, the outgoing side telephone number, the reception-side telephone number, and a communication start time which is a time output from the clock unit 48 in the history DB 452 (at S109). With this configuration, the call IDs and the history of the call IDs are stored with respect to the respective calls. The call control unit 43 determines whether or not the call end information is received from the mobile phone device 2 or 3 via the communication unit 46 (at S111). In a case where it is determined that the call end information is not received (at S111: NO), the call control unit 43 repeatedly performs the processing at S111 to continue the call.

In a case where it is determined that the call end information is received (at S111: YES), the call control unit 43 transmits the call end information to the mobile phone devices 2 and 3 (at S112). The mobile phone device 2 receives the call end information (at S113). Similarly, the mobile phone device 3 receives the call end information (at S114). The mobile phone device 2 refers to the time output from the clock unit 48 and stores the call end time in the history DB 452 while being associated with the call ID (at S115).

FIG. 11A to FIG. 11E are example flow charts of an obtaining process for use state information. After the communication is established between the mobile phone device 2 and the mobile phone device 3 through the processing at S107 and S108, the following processing is carried out. The control unit 21 of the mobile phone device 2 activates the control program 22P stored in the RAM 22 (at S121). The obtaining unit 25 previously obtains the access point from the communication unit 26. The control unit 21 reads out a threshold stored in the RAM 22 (at S122). The control unit 21 outputs the read out threshold to the measurement unit 261. The measurement unit 261 monitors packets passing through the communication unit 26 to measure the number of errors per unit time (at S123).

In a case where the number of errors per unit time is equal to or larger than the threshold as a condition, the measurement unit 261 determines that the communication quality is degraded. The measurement unit 261 determines whether or not the measured number of errors per unit time is equal to or larger than the number of errors per unit time (at S124). In a case where the number of errors per unit time is not equal to or larger than the threshold (at S124: NO), the measurement unit 261 determines whether or not the call end information at S113 is received (at S1240). In a case where it is determined that the call end information is not received (at S1240: NO), the measurement unit 261 returns the processing to at S123 and repeatedly executes the determination on the state of the communication quality.

In a case where it is determined that the communication end information is received (at S1240: YES), the measurement unit 261 ends the call. At S124, in a case where it is determined that the number of the errors is equal to or larger than the threshold (at S124: YES), the measurement unit 261 outputs the information indicating that the communication state is degraded to the control unit 21 (at S125). It is to be understood that the measurement unit 261 may directly output the information indicating that the communication state is degraded to the obtaining unit 25. The control unit 21 outputs a use state information obtaining command to the obtaining unit 25 (at S126). The obtaining unit 25 obtains the use state information (at S127). To be more specific, the obtaining unit 25 obtains the model name as the use state information from the model name file 221 and also obtains the wireless standard as the use state information from the communication unit 26. The obtaining unit 25 obtains the battery remaining amount as the use state information from the power source management unit 211, obtains information as to whether or not the earphone microphone 214 is connected from the connection device management unit 213 as the use state information, and obtains the reception intensity from the communication unit 26 as the use state information.

Also, the obtaining unit 25 obtains the access point from the communication unit 26 to be compared with the access point previously obtained and determines whether or not the change of the access point exists. The obtaining unit 25 obtains the presence or absence of the change of the access point as the use state information. The obtaining unit 25 obtains the moving speed from the GPS receiver 210 as the use state information. The control unit 21 refers to the output of the clock unit 215 and stores the time at which the use state information is obtained and the use state information obtained by the obtaining unit 25 in the RAM 22 (at S128). The control unit 21 transmits the use state information obtaining command via the communication unit 26 to the mobile phone device 3 (at S129). The control unit 31 of the mobile phone device 3 obtains the use state information obtaining command via the communication unit 36 (at S131). The control unit 31 activates a control program 32P stored in a RAM 32 (at S132). It is to be understood that the transmission and reception of the obtaining command between the mobile phone device 2 and the mobile phone device 3 may be carried out through the following method.

The mobile phone device 2 transmits the obtaining command to the call control unit 43 of the call control server 4 as a part of the call control message. The call control message includes the address at the transmission source which indicates the mobile phone device 2, the address at the transmission destination which indicates the mobile phone device 3, and the obtaining command for causing the obtaining unit 35 to obtain the use state information of the mobile phone device 3 itself. The call control unit 43 transmits the above-mentioned call control message to the mobile phone device 3. For the call control message, SIP (Session Initiation Protocol: standardized by RFC3261) which is standardized by IETF (The Internet Engineering Task Force) or the like may be utilized.

Also, the control unit 21 of the mobile phone device 2 may transmit the obtaining command for causing the server computer 1 to obtain the use state information of the mobile phone device 3 itself. In this case, from the call control server 4, the server computer 1 previously obtain the call ID, telephone numbers of the mobile phone devices 2 and 3 corresponding to the call ID, and the IP addresses of the mobile phone devices 2 and 3. The control unit 21 transmits the call ID, the telephone number of the mobile phone device 3, and the obtaining command to the server computer 1. The CPU 11 of the server computer 1 transmits the obtaining command to the IP address of the mobile phone device 3. The server computer 1 utilizes a DM (Device Management) message standardized by OMA (Open Mobile Alliance) or the like as an example of the obtaining command.

Other than those above, the communication unit 26 may be utilized and directly transmitted to the mobile phone device 3 as an audio signal control message. As an example of the audio signal control message, RTCP (RTP Control Protocol: standardized by RFC3550) standardized by IETF or the like may be utilized. The obtaining command may adopt any one of the above-mentioned modes as long as the obtaining command is transmitted to the mobile phone device 3. According to the present embodiment, a description will be given by exemplifying a case in which the call control message including the obtaining command is transmitted to the call control server 4. In a case where the obtaining command is obtained, the control unit 31 of the mobile phone device 3 activates the control program 32P. The obtaining unit 35 obtains the use state information such as the battery remaining amount of the mobile phone device 3 (at S133).

To be more specific, the obtaining unit 35 obtains a model name from a model name file 321 as the use state information and obtains the wireless standard from the communication unit 36 as the use state information. The obtaining unit 35 obtains the battery remaining amount from power source management unit 311 as the use state information, obtains information as to whether or not an earphone microphone 314 is connected from a connection device management unit 313 as the use state information, and obtains the reception intensity from the communication unit 36 as the use state information.

Also, the obtaining unit 35 obtains the access point from the communication unit 36 to be compared with the access point obtained at the call start time with the mobile phone device 2 and determines whether or not the change of the access point exists. The obtaining unit 35 obtains the presence or absence of the change of the access point as the use state information. The obtaining unit 35 obtains a moving speed from a GPS receiver 310 as the use state information. The control unit 31 refers to an output of a clock unit 315 and stores the time at which the use state information is obtained and the use state information obtained by the obtaining unit 35 in the RAM 32 (at S134).

It is to be understood that according to the present embodiment, the example has been illustrated in which after the use state information is obtained in the mobile phone device 2, the use state information obtaining command is transmitted to the mobile phone device 3, but the configuration is not limited to this. Before the use state information in the mobile phone device 2 is obtained at S127, the use state information obtaining command may also be transmitted to the mobile phone device 3. The control unit 21 of the mobile phone device 2 determines whether or not the call end information is received at S113 (at S135). In a case where it is determined that the call end information is not received (at S135: NO), the control unit 21 repeatedly performs the processing at S135.

In a case where it is determined that the call end information is received (at S135: YES), the control unit 21 reads out the IP address of the server computer 1 from the address file 223 (at S136). The control unit 21 transmits the call ID, the telephone number of the mobile phone device 2, the obtaining time of the use state information, and the use state information to the server computer 1 (at S137). The CPU 11 of the server computer 1 receives the call ID, the telephone number of the mobile phone device 2, the obtaining time of the use state information, and the use state information from the mobile phone device 2 (at S138). The CPU 11 stores the call ID, the telephone number of the mobile phone device 2, the obtaining time and the use state information in the use state information file 153 (at S139).

In parallel with the processing by the mobile phone device 2 at S135 to S137, the control unit 31 of the mobile phone device 3 carries out the following processing. The control unit 31 of the mobile phone device 3 determines whether or not the call end information is received at S114 (at S141). In a case where it is determined that the call end information is not received (at S141: NO), the control unit 31 repeatedly performs the processing at S141.

In a case where it is determined that the call end information is received (at S141: YES), the control unit 31 reads out the IP address of the server computer 1 from the address file 323 (at S142). The control unit 31 transmits the call ID, the telephone number of the mobile phone device 3, the obtaining time of the use state information, and the use state information to the server computer 1 (at S143). It is to be understood that according to the present embodiment, the example has been illustrated in which after the call, the mobile phone devices 2 and 3 transmit the use state information to the server computer 1, but the configuration is not limited to this. The mobile phone devices 2 and 3 may also transmit the use state information to the server computer 1 before the call end. The CPU 11 of the server computer 1 receives the call ID, the telephone number of the mobile phone device 3, the obtaining time of the use state information, and the use state information from the mobile phone device 3 (at S144). The CPU 11 stores the call ID, the telephone number of the mobile phone device 3, the obtaining time, and the use state information in the use state information file 153 (at S145).

In a case where all the pieces of use state information of the mobile phone devices 2 and 3 corresponding to the call ID are received, the CPU 11 of the server computer 1 shifts to an abnormality determination processing described below. The CPU 11 reads out the call ID, the model name of the mobile phone device 2, and the reference state information corresponding to the wireless standard from the reference DB 152 (at S146). The CPU 11 of the server computer 1 reads out the use state information of the mobile phone device 2 stored at S139. The CPU 11 determines whether or not the use state information which does not satisfy the reference state information of the mobile phone device 2 read out at S146 exists in the use state information of the mobile phone device 2 (at S147).

In a case where it is determined that the use state information which does not satisfy the reference state information exists in the mobile phone device 2 (at S147: YES), the CPU 11 stores the call ID, the telephone number of the mobile phone device 2, the obtaining time, and the use state information which does not satisfy the reference state information (at S148). For example, in the example of FIG. 9, in a case where the battery remaining amount is 2, this amount does not satisfy the reference "3 or higher" of the battery remaining amount depicted in FIG. 8. In this case, the call ID "001", the telephone number "03-**-5678", the obtaining time "11:00:30 on May 20", the use state information which does not satisfy the reference state information "the battery remaining amount" are stored. In a case where the use state information which does not satisfy the reference state information does not exist in the mobile phone device 2 (at S147: NO), the CPU 11** skips the processing at S148.

The CPU 11 reads out the call ID, the model name of the mobile phone device 3, and the reference state information corresponding to the wireless standard from the reference DB 152 (at S149). The CPU 11 reads out the use state information of the mobile phone device 3 stored at S145. The CPU 11 determines whether or not the use state information which does not satisfy the reference state information of the mobile phone device 3 read out at S149 exists in the use state information of the mobile phone device 3 (at S151). In a case where the use state information which does not satisfy the reference state information exists in the mobile phone device 3 (at S151: YES), the CPU 11 stores the call ID, the telephone number of the mobile phone device 3, the obtaining time, and the use state information which does not satisfy the reference state information (at S152). In a case where it is determined that the use state information which does not satisfy the reference state information does not exist in the mobile phone device 3 (at S151: NO), the CPU 11 skips the processing at S152 and end the processing. It is to be understood that according to the present embodiment, the example has been illustrated in which the mobile phone device 2 obtains the use state information first, and the obtaining request is performed from the mobile phone device 2 to the mobile phone device 3. Similarly, the mobile phone device 3 may obtain the use state information first, and the obtaining request is performed from the mobile phone device 3 to the mobile phone device 2. In this case, the obtaining unit 2 functions as a second obtaining unit, and the obtaining unit 25 obtains the use state information of the mobile phone device 2. With this configuration, it is possible to determine in which one of the mobile phone device 2 and the mobile phone device 3 the abnormality exists. Also, it is possible to easily identify the factor for the abnormality in the call quality other than the communication quality.

Second Embodiment

Figure 12:
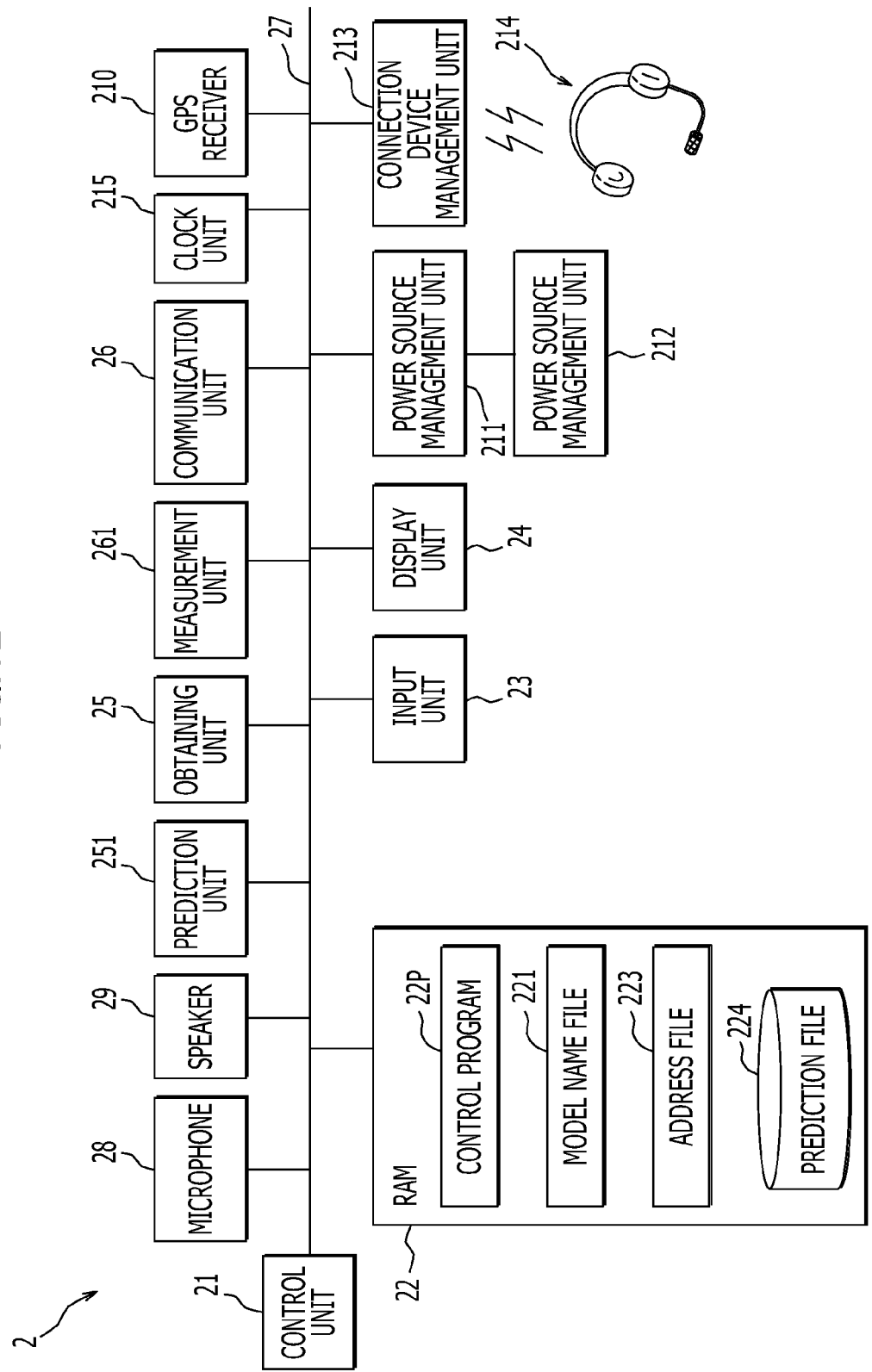
FIG. 12 depicts an example hardware configuration of the mobile phone device according to a second embodiment.

A second embodiment relates to a mode of predicting a change in the communication state during the call. FIG. 12 depicts an example hardware configuration of the mobile phone device 2 according to a second embodiment. In FIG. 12, a prediction unit 251 and a prediction file 224 are provided in addition to the configuration of FIG. 2. A prediction unit 351 and a prediction file 324 are similarly provided on the mobile phone device 3 side. It is to be understood that an illustration on the mobile phone device 3 side is omitted. The prediction unit 251 refers to the prediction file 224 to predict whether or not the communication state may be degraded. In a case where it is predicted that the communication state may be degraded, the prediction unit 251 outputs the obtaining command to the obtaining unit 25. After that, the obtaining unit 25 obtains the use state information through the processing described according to the first embodiment.

The prediction unit 251 collects the battery remaining amount output from the power source management unit 211, the reception intensity and the presence or absence of the change of the access point output from the communication unit 26, and the presence or absence of the earphone microphone 214 output from the connection device management unit 213. Also, the prediction unit 251 collects the change in the moving speed output from the GPS receiver 210. It is to be understood that information collected by the prediction unit 251 will be hereinafter referred to as collection information. According to the present embodiment, an example will be described in which the degradation prediction in the communication state is carried out on the basis of the plural pieces of collection information such as the battery remaining amount and the reception intensity, but the configuration is not limited to this. For example, the degradation prediction in the communication state may also be carried out on the basis of one piece of collection information such as the reception intensity. It is to be understood that it suffices if the prediction unit 251 periodically (for example, every second) collects the collection information.

FIG. 13 depicts an example record layout of a prediction file 224. The prediction file 224 includes a change field of the battery remaining amount, a change field of the earphone microphone 214, a change field of the reception intensity, a change field of the access point, a change field of the moving speed, and the like. In a case where the change of the collection information is matched with the change stored in the prediction file 224, the prediction unit 251 predicts that the communication state is degraded. As depicted in FIG. 13, the information on the change is stored while being associated with the respective hardware of the mobile phone device 2 in the prediction file 224. In the change field of the battery remaining amount, as the information on the change of the battery remaining amount, "reduced" is stored. In a case where the battery remaining amount periodically collected from the power source management unit 211 is decreased, the prediction unit 251 predicts that the communication state is degraded.

In the change field of the earphone microphone 214, as the information on the change of the earphone microphone 214, "from absent to present" is stored. While information indicating that the earphone microphone 214 is not connected is collected from the connection device management unit 213, in a case where information indicating that the earphone microphone 214 is connected is collected, the prediction unit 251 predicts that the communication state is degraded. In the change field of the reception intensity, as the information on the change, "decreased" is stored. In a case where the reception intensity periodically collected from the communication unit 26 is decreased, the prediction unit 251 predicts that the communication state is degraded.

In the change field of the access point, as the change information of the access point, "from absent to present" is stored. In a case where a new access point which is different from the utilized access point is collected from the communication unit 26, the prediction unit 251 predicts that the communication state is degraded. In the change field of the moving speed, as the information on the change, "increased by specified speed" is stored. This specified speed may be set, for example, as 1 m/s per unit time. The prediction unit 251 collects the moving speed of the mobile phone device 2 from the GPS receiver 210 at regular time intervals. In a case where the change of the collected moving speed per unit time is equal to or higher than the specified speed, it is determined that the communication state is degraded. In a case where the prediction unit 251 determines that the communication state is degraded because of any one or a plurality of the above-mentioned changes, the prediction unit 251 outputs the obtaining command to the obtaining unit 25. Hereinafter, to facilitate the description, an example will be described in which the degradation prediction in the communication state in the prediction unit 251 is carried out on the basis of the change in the moving speed.

In a case where the obtaining command is accepted from the prediction unit 251 as described above, the obtaining unit 25 obtains the use state information. It is to be understood that the user may also input the obtaining command from the input unit 23. The input unit 23 accepts the obtaining command. In this case, during the call, in a case where in the input unit 23, a dedicated button, an arbitrary button previously allocated (for example, a button for numeric 1), or an icon displayed on a touch panel is operated, the input unit 23 accepts the obtaining command. In a case where the obtaining command is accepted, the input unit 23 outputs the obtaining command to the obtaining unit 25. In response to the obtaining command, the obtaining unit 25 obtains the use state information described according to the first embodiment. As described above, a trigger for obtaining the use state information includes a case in which the measurement unit 261 measures the degradation in the communication state, a case in which the prediction unit 251 predicts the degradation in the communication state, and a case in which the obtaining command is accepted from the input unit 23. All these three cases may be used as the triggers, and also only one case may be used as the trigger. In addition, a combination of two cases may be appropriately used as the trigger. According to the present embodiment, a description will be given by exemplifying the case in which all the three cases are used.

Figure 14A:
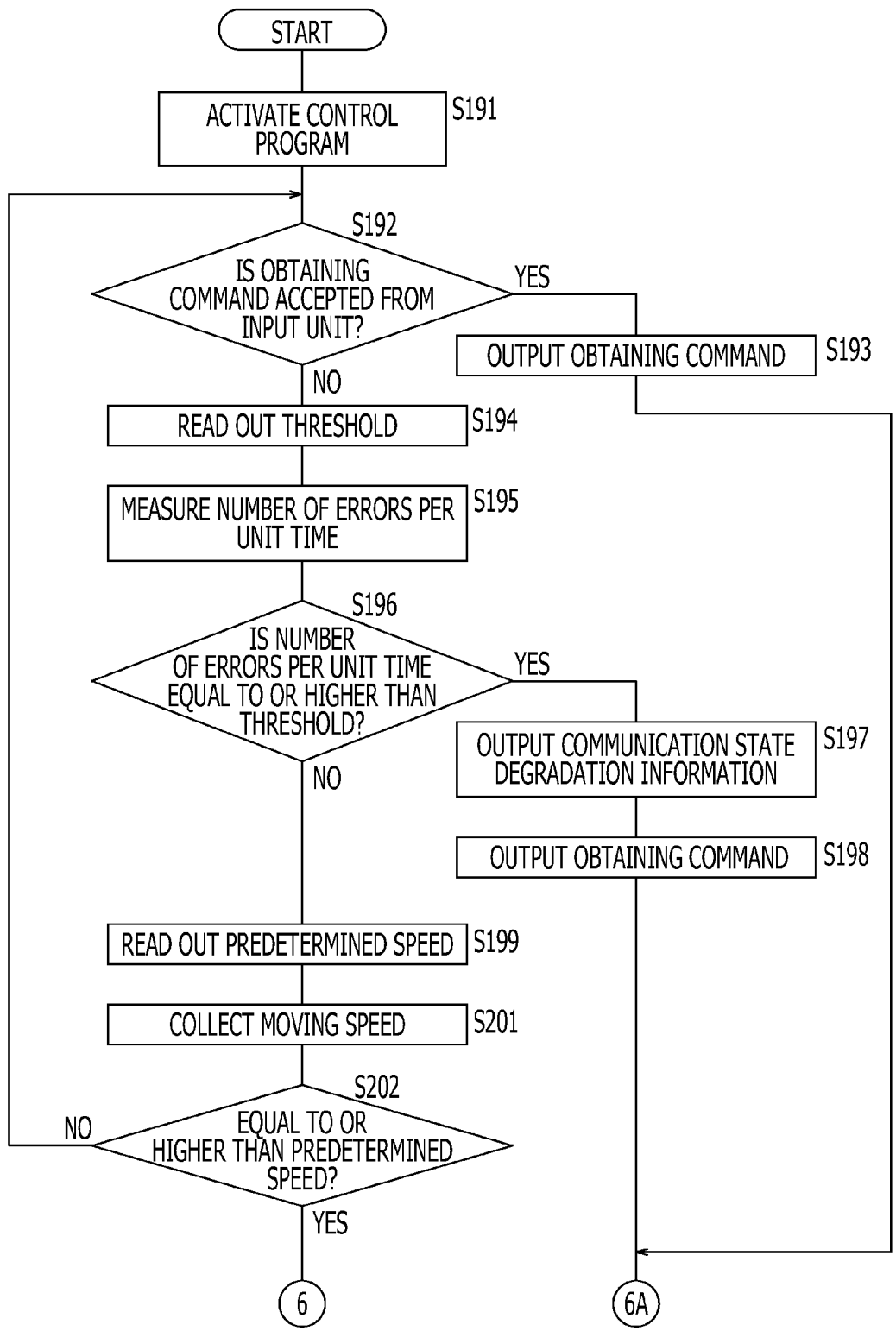
FIGS. 14A-14B are example flow charts of an obtaining command output process.
Figure 14B:
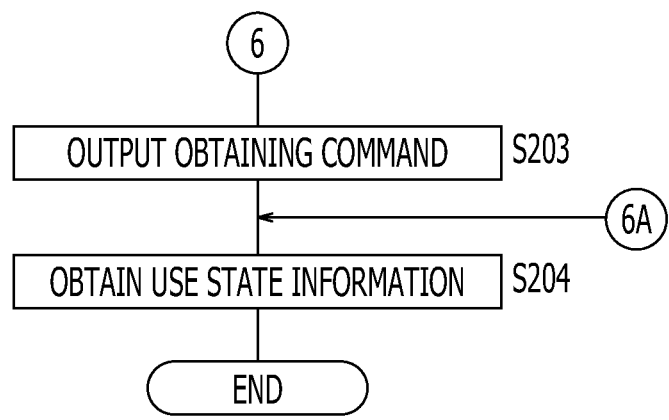
Figure 16B:
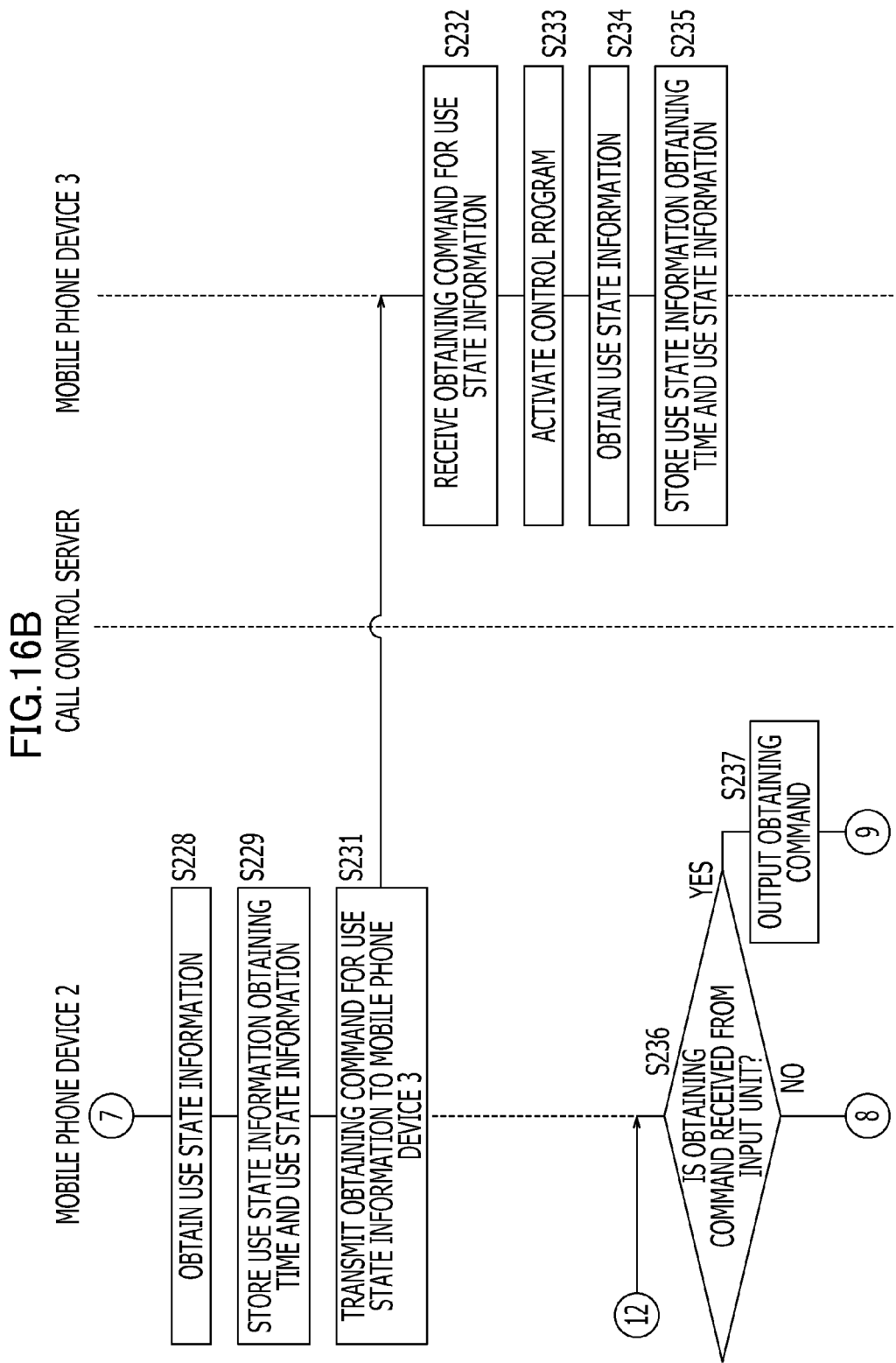

FIG. 14A and FIG. 14B are example flow charts of an obtaining command output process. The control unit 21 of the mobile phone device 2 activates the control program 22P stored in the RAM 22 (at S191). The control unit 21 determines whether or not the obtaining command is accepted from the input unit 23 (at S192). In a case where it is determined that the obtaining command is accepted (at S192: YES), the input unit 23 outputs the obtaining command to the obtaining unit 25 (at S193). In a case where it is determined that the obtaining command is not accepted (at S192: NO), the input unit 23 shifts the processing to S194. The control unit 21 reads out the threshold stored in the RAM 22 (at S194). The control unit 21 outputs the read out threshold to the measurement unit 261. The measurement unit 261 monitors the packets passing through the communication unit 26 to measure the number of errors per unit time (at S195).

In a case where the number of errors per unit time is equal to or larger than the threshold as a condition, the measurement unit 261 determines that the communication quality is degraded. The measurement unit 261 determines whether or not the measured number of errors per unit time is equal to or larger than the number of errors per unit time (at S196). In a case where it is determined that the number of the errors is equal to or larger than the threshold (at S196: YES), the measurement unit 261 outputs the information indicating that the communication state is degraded to the control unit 21 (at S197). The control unit 21 outputs the use state information obtaining command to the obtaining unit 25 (at S198).

In a case where the number of errors per unit time is not equal to or larger than the threshold (at S196: NO), the measurement unit 261 shifts the processing to S199. The prediction unit 251 reads out the specified speed functioning as the threshold stored in the RAM 22 (at S199). The prediction unit 251 collects the moving speed from the GPS receiver 210 periodically (for example, every second) for a specified period of time (for example, 3 seconds) (at S201). The prediction unit 251 calculates the change per unit time of the moving speed. It is to be understood that the change per unit time of the moving speed of the mobile phone device 2 may also be collected from an acceleration sensor which is not depicted. Other than those above, the GPS receiver 210 may also calculate the change per unit time of the moving speed.

The prediction unit 251 determines whether or not the change per unit time of the moving speed is equal to or higher than the specified speed (at S202). In a case where it is determined that the change per unit time of the moving speed is equal to or higher than the specified speed (at S202: YES), the prediction unit 251 outputs the obtaining command to the obtaining unit 25 (at S203). In a case where it is determined that the change per unit time of the moving speed is not equal to or higher than the specified speed (at S202: NO), the prediction unit 251 returns the processing to S192 and repeatedly performs the above-mentioned processing. Through the processing at S193, S198, or S203, in a case where the obtaining unit 25 accepts the obtaining command, the obtaining unit 25 obtains the use state information (at S204). The subsequent processing is similar to that at S128 and subsequent processings, and a detailed description thereof will be omitted. It is to be understood that the execution order of S192, S196, or S202 which is one of the three triggers is not limited to the order depicted in FIG. 14A and FIG. 14B. Other orders may also be adopted. Also in a case where it is predicted that the communication state is degraded, the obtaining of the use state information is executed, and therefore the degradation in the communication state may be grasped in an early stage. In addition, the obtaining of the use state information may be carried out on the basis of an intention of the user.

The present second embodiment is as described above, and the other configuration is similar to the first embodiment. Therefore, corresponding parts are assigned with the same reference symbols, and a detailed description thereof will be omitted.

Third Embodiment

A third embodiment relates to a mode in which the use state information is obtained by plural times in the mobile phone device 2 or 3. FIG. 15 depicts an example record layout of the use state file 153 according to the third embodiment. The obtaining unit 25 may obtain the use state information again during the call through the above-mentioned three triggers even after the use state information is obtained as described according to the first embodiment. In the example of FIG. 15, the mobile phone device 2 measures the use state information again at 11:00:45 on May 20, and these pieces of information are thus stored.

Furthermore, 10 seconds later, the mobile phone device 3 receiving the obtaining command from the mobile phone device 2 measures the use state information again, and these pieces of information are thus stored. When the use state information at 11:00:30 of the mobile phone device 2 is compared with the use state information at 11:00:45, it is possible to understand that the access point is changed from AP1 to AP2. Along with the change of the access point, in a case where the measurement unit 261 detects the degradation in the communication state, a case where the prediction unit 251 predicts the degradation, or a case where the obtaining command is accepted from the input unit 23, the obtaining unit 25 obtains the use state information again. It is to be understood that also in a case where the use state is obtained again, similarly as in the second embodiment, all these three cases may be used as the triggers, and also only one case may be used as the trigger. In addition, a combination of two cases may be appropriately used as the trigger. According to the present embodiment, a description will be given by exemplifying a case in which all the three cases are used as the triggers.

FIG. 16A to FIG. 16H example flow charts of a use state information obtaining process. The control unit 21 of the mobile phone device 2 activates the control program 22P stored in the RAM 22 (at S221). The control unit 21 reads out the threshold stored in the RAM 22 (at S222). The control unit 21 outputs the read out threshold to the measurement unit

261. The measurement unit 261 monitors the packets passing through the communication unit 26 to measure the number of errors per unit time (at S223).

In a case where the number of errors per unit time is equal to or larger than the threshold as a condition, the measurement unit 261 determines that the communication quality is degraded. The measurement unit 261 determines whether or not the measured number of errors per unit time is equal to or larger than the number of errors per unit time (at S224). In a case where the number of errors per unit time is not equal to or larger than the threshold (at S224: NO), the measurement unit 261 determines whether or not the call end information at S113 is received (at S225). In a case where it is determined that the call end information is not received (at S225: NO), the measurement unit 261 returns the processing to S223 and repeatedly executes the determination on the state of the communication quality.

In a case where it is determined that the communication end information is received (at S225: YES), the measurement unit 261 ends the call. At S224, in a case where it is determined that the number of the errors is equal to or larger than the threshold (at S224: YES), the measurement unit 261 outputs the information indicating that the communication state is degraded to the control unit 21 (at S226). The control unit 21 outputs the use state information obtaining command to the obtaining unit 25 (at S227). The obtaining unit 25 obtains the use state information (at S228). It is to be understood that instead of the processing from S221 to S227 or in addition to this processing, by utilizing the prediction unit 251 and the input unit 23, the use state information may also be obtained. In this case, it suffices that the processing from S191 to S204 described according to the second embodiment is executed.

The control unit 21 refers to the output of the clock unit 215 and stores the obtaining time at which the use state information is obtained and the use state information obtained by the obtaining unit 25 in the RAM 22 (at S229). The control unit 21 transmits the use state information obtaining command via the communication unit 26 to the mobile phone device 3 (at S231). The control unit 31 of the mobile phone device 3 obtains the use state information obtaining command via the communication unit 36 (at S232). The control unit 31 activates the control program 32P stored in the RAM 32 (at S233).

The obtaining unit 35 obtains the use state information such as the battery remaining amount of the mobile phone device 3 (at S234). The control unit 31 refers to the output of the clock unit 315 and stores the time at which the use state information is obtained and the use state information obtained by the obtaining unit 35 in the RAM 32 (at S235).

The control unit 21 determines whether or not the obtaining command is accepted from the input unit 23 (at S236). In a case where it is determined that the obtaining command is accepted (at S236: YES), the input unit 23 outputs the obtaining command to the obtaining unit 25 (at S237). In a case where it is determined that the obtaining command is not accepted (at S236: NO), the input unit 23 shifts the processing to S238. The control unit 21 reads out the threshold stored in the RAM 22 (at S238). The control unit 21 outputs the read out threshold to the measurement unit 261. The measurement unit 261 monitors the packets passing through the communication unit 26 to measure the number of errors per unit time (at S239).

In a case where the number of errors per unit time is equal to or larger than the threshold as a condition, the measurement unit 261 determines that the communication quality is degraded. The measurement unit 261 determines whether or not the measured number of errors per unit time is equal to or larger than the number of errors per unit time (at S241). In a case where it is determined that the number of the errors is equal to or larger than the threshold (at S241: YES), the measurement unit 261 outputs the information indicating that the communication state is degraded to the control unit 21 (at S242). The control unit 21 outputs the use state information obtaining command to the obtaining unit 25 (at S243).

In a case where the number of errors per unit time is not equal to or larger than the threshold (at S241: NO), the measurement unit 261 shifts the processing to S244. The prediction unit 251 reads out the specified speed functioning as the threshold stored in the RAM 22 (at S244). The prediction unit 251 collects the moving speed from the GPS receiver 210 periodically (for example, every second) for a specified period of time (for example, 3 seconds) (at S245). The prediction unit 251 calculates the change per unit time of the moving speed.

The prediction unit 251 determines whether or not the change per unit time of the moving speed is equal to or higher than the specified speed (at S246). In a case where it is determined that the change per unit time is equal to or higher than the specified speed (at S246: YES), the prediction unit 251 outputs the obtaining command to the obtaining unit 25 (at S247). After S237, S243, or S247, the obtaining unit 25 obtains the use state information again (at S248). The control unit 21 refers to the output of the clock unit 215 and stores the obtaining time at which the use state information is obtained and the use state information obtained by the obtaining unit 25 in the RAM 22 (at S249). The control unit 21 transmits the use state information obtaining command again via the communication unit 26 to the mobile phone device 3 (at S251). The control unit 31 of the mobile phone device 3 obtains the use state information obtaining command via the communication unit 36 (at S252). The control unit 31 activates the control program 32P stored in the RAM 32 (at S253).

The obtaining unit 35 obtains the use state information such as the battery remaining amount of the mobile phone device 3 again (at S254). The control unit 31 refers to the output of the clock unit 315 and stores the time at which the use state information is obtained and the use state information obtained by the obtaining unit 35 in the RAM 32 (at S255). After the processing at S251 or at S246, in a case where it is determined that the change per unit time of the moving speed is not equal to or higher than the specified speed (at S246: NO), the prediction unit 251 shifts the processing to S256. The control unit 21 of the mobile phone device 2 determines whether or not the call end information is received (at S256). In a case where it is determined that the call end information is not received (at S256: NO), the control unit 21 returns the processing to S236 and repeatedly performs the above-mentioned processing. With this configuration, during the call, the obtaining of the use state information is carried out by plural times, and also, the obtaining command is transmitted by plural times to the mobile phone device 3.

In a case where it is determined that the call end information is received (at S256: YES), the control unit 21 shifts the processing to S257. The control unit 21 reads out the IP address of the server computer 1 from the address file 223 (at S257). The control unit 21 transmits the call ID, the telephone number of the mobile phone device 2, the obtaining time of the use state information, and the use state information to the server computer 1 (at S258). It is to be understood that as to the obtaining time of the use state information and the use state information, the pieces of information obtained by plural times at S228 and S248 are transmitted. The CPU 11 of the server computer 1 receives the call ID, the telephone number of the mobile phone device 2, the obtaining time of the use state information, and the use state information from the mobile phone device 2 (at S259). The CPU 11 stores the call ID, the telephone number of the mobile phone device 2, the obtaining time, and the use state information in the use state information file 153 as depicted in FIG. 15 (at S261).

The control unit 31 of the mobile phone device 3 determines whether or not the call end information is received (at S262). In a case where it is determined that the call end information is not received (at S262: NO), the control unit 31 shifts the state to the reception standby state again for the obtaining command transmitted from the mobile phone device 2 at S252.

In a case where it is determined that the call end information is received (at S262: YES), the control unit 31 reads out the IP address of the server computer 1 from the address file 323 (at S263). The control unit 31 transmits the call ID, the telephone number of the mobile phone device 3, the obtaining time of the use state information, and the use state information to the server computer 1 (at S264). It is to be understood that as to the obtaining time of the use state information and the use state information, the pieces of information obtained by plural times at S234 and S254 are transmitted. The CPU 11 of the server computer 1 receives the call ID, the telephone number of the mobile phone device 3, the obtaining time of the use state information, and the use state information from the mobile phone device 3 (at S265). The CPU 11 stores the call ID, the telephone number of the mobile phone device 3, the obtaining time, and the use state information in the use state information file 153 as depicted in FIG. 15 (at S266).

In a case where all the pieces of use state information of the mobile phone devices 2 and 3 corresponding to the call ID are received, the CPU 11 of the server computer 1 shifts to an abnormality determination processing described below. The CPU 11 reads out the call ID, the model name of the mobile phone device 2, and the reference state information corresponding to the wireless standard from the reference DB 152 (at S267). The CPU 11 of the server computer 1 reads out the plural pieces of use state information of the mobile phone device 2 stored at S261. The CPU 11 determines whether or not the use state information which does not satisfy the reference state information of the mobile phone device 2 read out at S267 exists in the use state information of the mobile phone device 2 (at S268).

In a case where it is determined that the use state information which does not satisfy the reference state information exists in the mobile phone device 2 (at S268: YES), the CPU 11 stores the call ID, the telephone number of the mobile phone device 2, the obtaining time, and the use state information which does not satisfy the reference state information (at S269). In a case where the use state information which does not satisfy the reference state information does not exist in the mobile phone device 2 (at S268: NO), the CPU 11 skips the processing at S269.

The CPU 11 reads out the call ID, the model name of the mobile phone device 3, and the reference state information corresponding to the wireless standard from the reference DB 152 (at S271). The CPU 11 reads out the plural pieces of the use state information of the mobile phone device 3 stored at S266. The CPU 11 determines whether or not the use state information which does not satisfy the reference state information of the mobile phone device 3 read out at S271 exists in the use state information of the mobile phone device 3 (at S272). In a case where the use state information which does not satisfy the reference state information exists in the mobile phone device 3 (at S272: YES), the CPU 11 stores the call ID, the telephone number of the mobile phone device 3, the obtaining time, and the use state information which does not satisfy the reference state information (at S273). In a case where it is determined that the use state information which does not satisfy the reference state information does not exist in the mobile phone device 3 (at S272: NO), the CPU 11 skips the processing at S273 and ends the processing. With this configuration, even in a case where the situation is changed during the call, it is possible to execute the abnormality determination processing following this situation.

The present third embodiment is as described above, and the other configuration is similar to the first and second embodiments. Therefore, corresponding parts are assigned with the same reference symbols, and a detailed description thereof will be omitted.

Fourth Embodiment

Figure 17A:
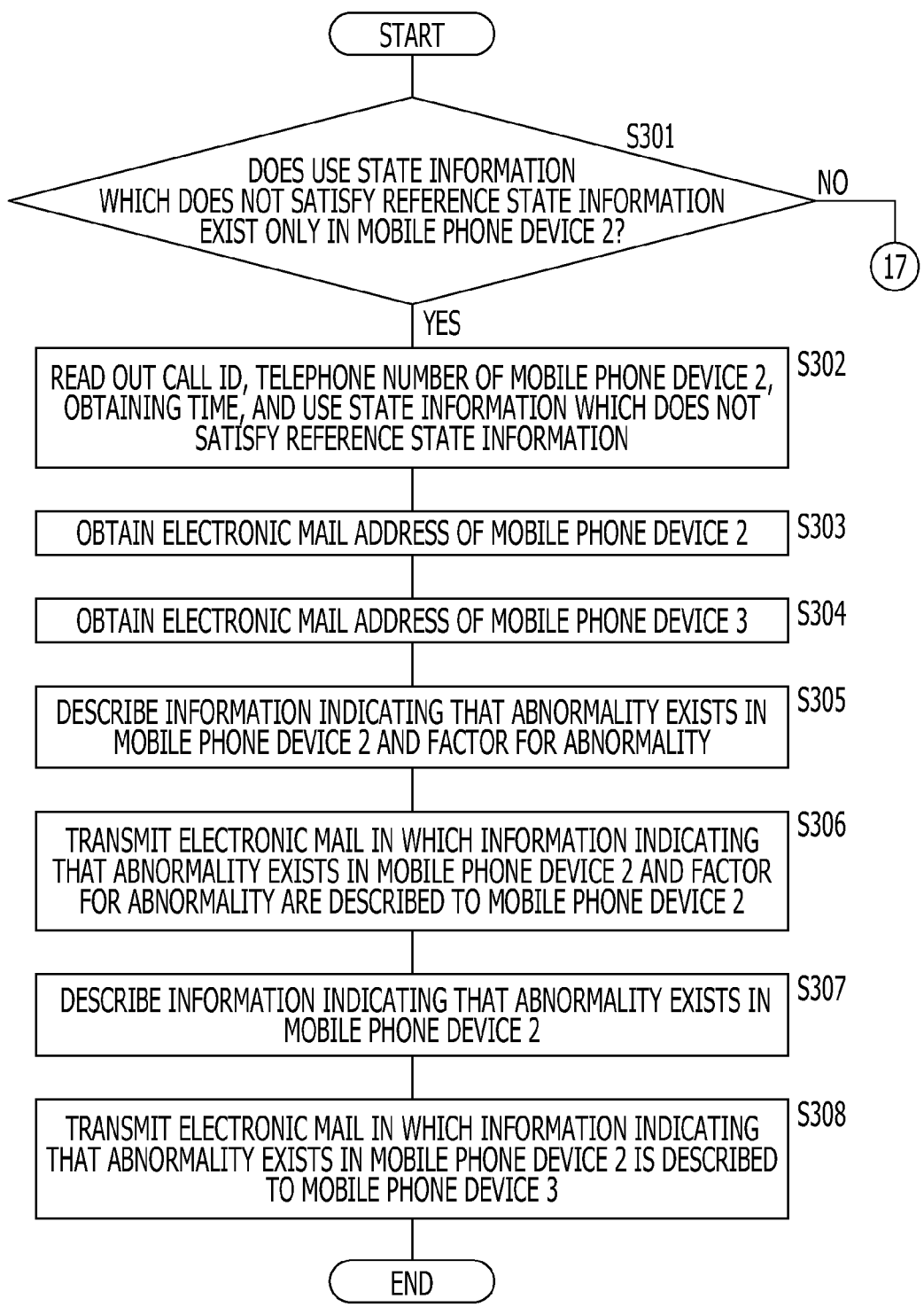
Figure 17B:
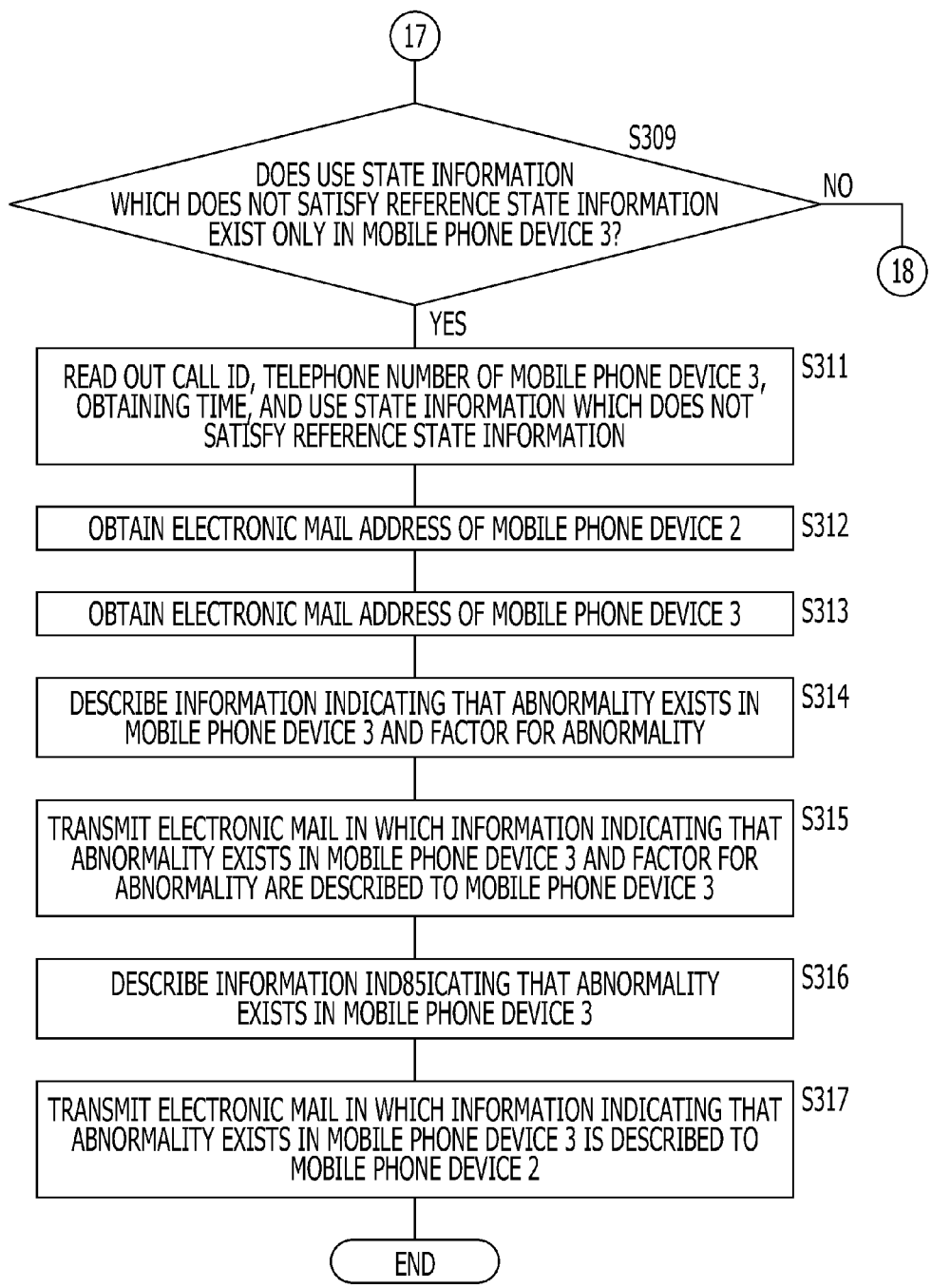

A fourth embodiment relates to a processing after it is determined that the abnormality exists. The CPU 11 of the server computer 1 outputs the use state information determined as abnormal according to the first to third embodiments via the display unit 14 or the communication unit 16 to an external computer or a printer (not depicted). Other than those above, as will be described below, the CPU 11 may also transmit the use state information determined as abnormal to the mobile phone device 2 or 3. FIG. 17A to FIG. 17C are example flow charts of a process when an abnormality notification is performed. After the processing at S146 or S267, the following processing may also be executed as a sub routine. The CPU 11 of the server computer 1 determines whether or not the use state information which does not satisfy the reference state information of the mobile phone device 2 read out at S267 or the like exists in the use state information only of the mobile phone device 2 (at S301). In a case where it is determined that the use state information which does not satisfy the reference state information exists in the mobile phone device 2 (at S301: YES), the CPU 11 shifts to S302. The CPU 11 reads out the call ID, the telephone number of the mobile phone device 2, the obtaining time, and the use state information which does not satisfy the reference state information stored at S148 and S269 (at S302).

The CPU 11 of the server computer 1 obtains an electronic mail address of the user using the mobile phone device 2 which is previously stored in the storage unit 15 while being associated with the telephone number of the mobile phone device 2, the user ID, or the like (at S303). Similarly, the CPU 11 obtains an electronic mail address of the user using the mobile phone device 3 which is previously stored in the storage unit 15 while being associated with the telephone number of the mobile phone device 3, the user ID, or the like (at S304). The CPU 11 describes the information indicating that the abnormality exists in the mobile phone device 2 and the factor for the abnormality in the electronic mail (at S305).

The information indicating that the abnormality exists in the mobile phone device 2 may be a text sentence including the obtaining time and a sentence indicating that the abnormality exists on the telephone number of the mobile phone device 2 side. For example, in the example of FIG. 9, "Abnormality is generated on 03-**-5678 side at 11:00:30 on May 20." or the like may be used. It is to be understood that instead of the obtaining time, the history DB 452 may be referred to, and the call start time may be described. Also, as depicted in FIG. 15, in a case where the abnormality is generated by plural times, a plurality of text sentences indicating that the abnormality exists may be created. For example, "Abnormality is generated on 03--5678 side at 11:00:30 on May 20. Also, abnormality is generated on 03-**-5678 side at 11:00:45 on May 20." may be used.

The factor for the abnormality may be described by way of the obtaining time, an item of the use state information different from the reference state information, and the like in a text format. For example, "Factor for abnormality at 11:00:30 on May 20 is earphone microphone" or the like may be used. Also, in a case where the abnormality is generated by plural times, a plurality of text sentences indicating the factor for the abnormality may be created. For example, "Factor for abnormality at 11:00:30 on May 20 is earphone microphone. Also, factor for abnormality at 11:00:45 on May 20 is access point." may be used.

The CPU 11 transmits the electronic mail in which the information indicating that the abnormality exists in the mobile phone device 2 and the factor for the abnormality are described to the mobile phone device 2 by referring to the obtained electronic mail address (at S306). The CPU 11 describes the information indicating that the abnormality exists in the mobile phone device 2 in the electronic mail for the mobile phone device 3 (at S307). It is to be understood that at S307, as being different from S305, the factor for the abnormality is not described. As the use state information may be related to a privacy of the user of the mobile phone device 2, for the user of the mobile phone device 3, these pieces of information are not described. It is to be understood that in accordance with the design, the factor for the abnormality may of course be described for the user of the mobile phone device 3 too.

The CPU 11 transmits the electronic mail in which the information indicating that the abnormality exists in the mobile phone device 2 is described to the mobile phone device 3 by referring to the obtained electronic mail address (at S308). In a case where it is not determined that the use state information which does not satisfy the reference state information exists in the mobile phone device 2 (at S301: NO), the CPU 11 shifts to S309. The CPU 11 determines whether or not the use state information which does not satisfy the reference state information exists only in the mobile phone device 3 (at S309). In a case where the use state information which does not satisfy the reference state information exists only in the mobile phone device 3 (at S309: YES), the CPU 11 shifts to S311. The CPU 11 reads out the call ID, the telephone number of the mobile phone device 3, the obtaining time, and the use state information which does not satisfy the reference state information stored at S152 and S273 (at S311).

The CPU 11 of the server computer 1 obtains the electronic mail address of the mobile phone device 2 previously stored in the storage unit 15 (at S312). Similarly, the CPU 11 obtains the electronic mail address of the mobile phone device 3 previously stored in the storage unit 15 (at S313). The CPU 11 describes the information indicating that the abnormality exists in the mobile phone device 3 and the factor for the abnormality in the electronic mail (at S314).

The CPU 11 transmits the electronic mail in which the information indicating that the abnormality exists in the mobile phone device 3 and the factor for the abnormality are described to the mobile phone device 3 by referring to the obtained electronic mail address (at S315). The CPU 11 describes the information indicating that the abnormality exists in the mobile phone device 3 in the electronic mail for the mobile phone device 3 (at S316). The CPU 11 transmits the electronic mail in which the information indicating that the abnormality exists in the mobile phone device 3 is described to the mobile phone device 2 by referring to the obtained electronic mail address (at S317).

At S309, in a case where it is not determined that the use state information which does not satisfy the reference state information exists only in the mobile phone device 3 (at S309: NO), the CPU 11 shifts to S318. The CPU 11 determines whether or not the use state information which does not satisfy the reference state information exists in both the mobile phone device 2 and the mobile phone device 3 (at S318). In a case where it is determined that the use state information which does not satisfy the reference state information exists in both the mobile phone device 2 and the mobile phone device 3 (at S318: YES), the CPU 11 shifts to S319. The CPU 11 reads out the call ID, the telephone number of the mobile phone device 2, the obtaining time, and the use state information which does not satisfy the reference state information stored at S148 and S269 (at S319).

The CPU 11 reads out the call ID, the telephone number of the mobile phone device 3, the obtaining time, and the use state information which does not satisfy the reference state information stored at S152 and S273 (at S321). The CPU 11 of the server computer 1 obtains the electronic mail address of the mobile phone device 2 previously stored in the storage unit 15 (at S322). Similarly, the CPU 11 obtains the electronic mail address of the mobile phone device 3 previously stored in the storage unit 15 (at S323). The CPU 11 describes the information indicating that the abnormality exists in the mobile phone device 2 and the mobile phone device 3 and the factor for the abnormality of the mobile phone device 2 in the electronic mail (at S324).

The CPU 11 transmits the electronic mail in which the information indicating that the abnormality exists in the mobile phone device 2 and the mobile phone device 3 and the factor for the abnormality of the mobile phone device 2 are described to the mobile phone device 2 by referring to the obtained electronic mail address (at S325). The CPU 11 describes the information indicating that the abnormality exists in the mobile phone device 2 and the mobile phone device 3 and the factor for the abnormality of the mobile phone device 3 in the electronic mail (at S326).

The CPU 11 the electronic mail in which the information indicating that the abnormality exists in the mobile phone device 2 and the mobile phone device 3 and the factor for the abnormality of the mobile phone device 3 are described to the mobile phone device 3 by referring to the obtained electronic mail address (at S327). At S308 and S317 and in a case where it is not determined that the use state information which does not satisfy the reference state information exists in both the mobile phone device 2 and the mobile phone device 3 (at S318: NO), the CPU 11 ends the processing. With this configuration, the users using the mobile phone devices 2 and 3 may easily grasp in which one of the mobile phone devices 2 and 3 the problem exists. In addition, the factor may also be identified while protecting the privacy.

The present fourth embodiment is as described above, and the other configuration is similar to the first to third embodiments. Therefore, corresponding parts are assigned with the same reference symbols, and a detailed description thereof will be omitted.

Fifth Embodiment

Figure 18:
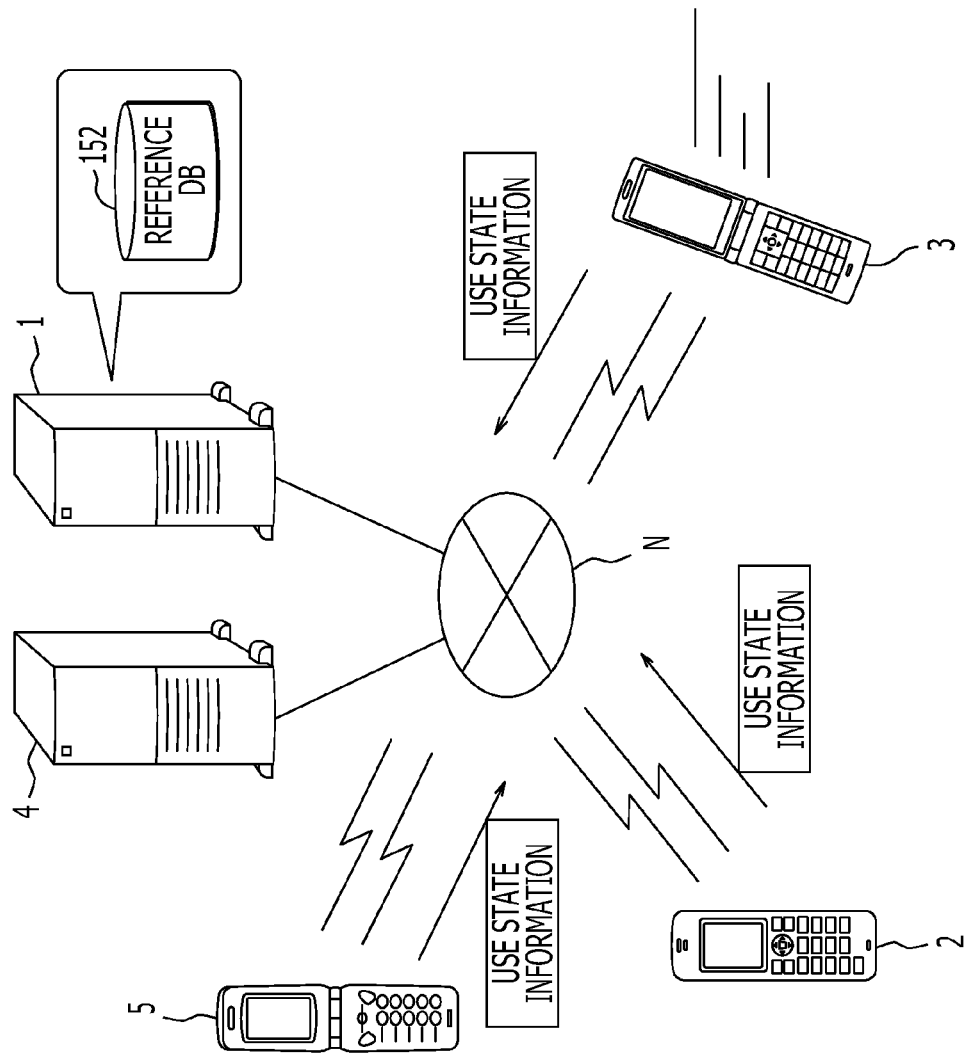
FIG. 18 depicts an example of a communication system according to a fifth embodiment.

A fifth embodiment relates to a mode in which the processing is carried out by at least three of the mobile phone devices 2. FIG. 18 depicts an example of a communication system according to a fifth embodiment. In addition to the configuration according to the first to fourth embodiments, a mobile phone device 5 is further added. The mobile phone device 5 is similar to the mobile phone device 2, and the call is simultaneously carried out by the three mobile phone devices including the mobile phone device 2, the mobile phone device 3, and the mobile phone device 5.

The mobile phone device 2 obtains the use state information. Then, the use state information obtaining command is transmitted to the mobile phone device 3 and the mobile phone device 5 during the call. The mobile phone device 3 obtains its own use state information. The mobile phone device 5 obtains its own use state information. After the call, the mobile phone device 2, the mobile phone device 3, and the mobile phone device 5 transmit the use state information obtained by itself to the server computer 1. The server computer 1 compares the reference state information of the reference DB 152 with the respective pieces of use state information to determine whether or not an abnormality exists in which one of the mobile phone devices. It is to be understood that further more mobile phone devices may of course be used. With this configuration, even when the number of mobile phone devices calling at the time is increased, it is possible to easily identify the mobile phone device where the abnormality is generated and the factor for the abnormality.

The present fifth embodiment is as described above, and the other configuration is similar to the first fourth embodiments. Therefore, corresponding parts are assigned with the same reference symbols, and a detailed description thereof will be omitted.

Six Embodiment

Figure 19:
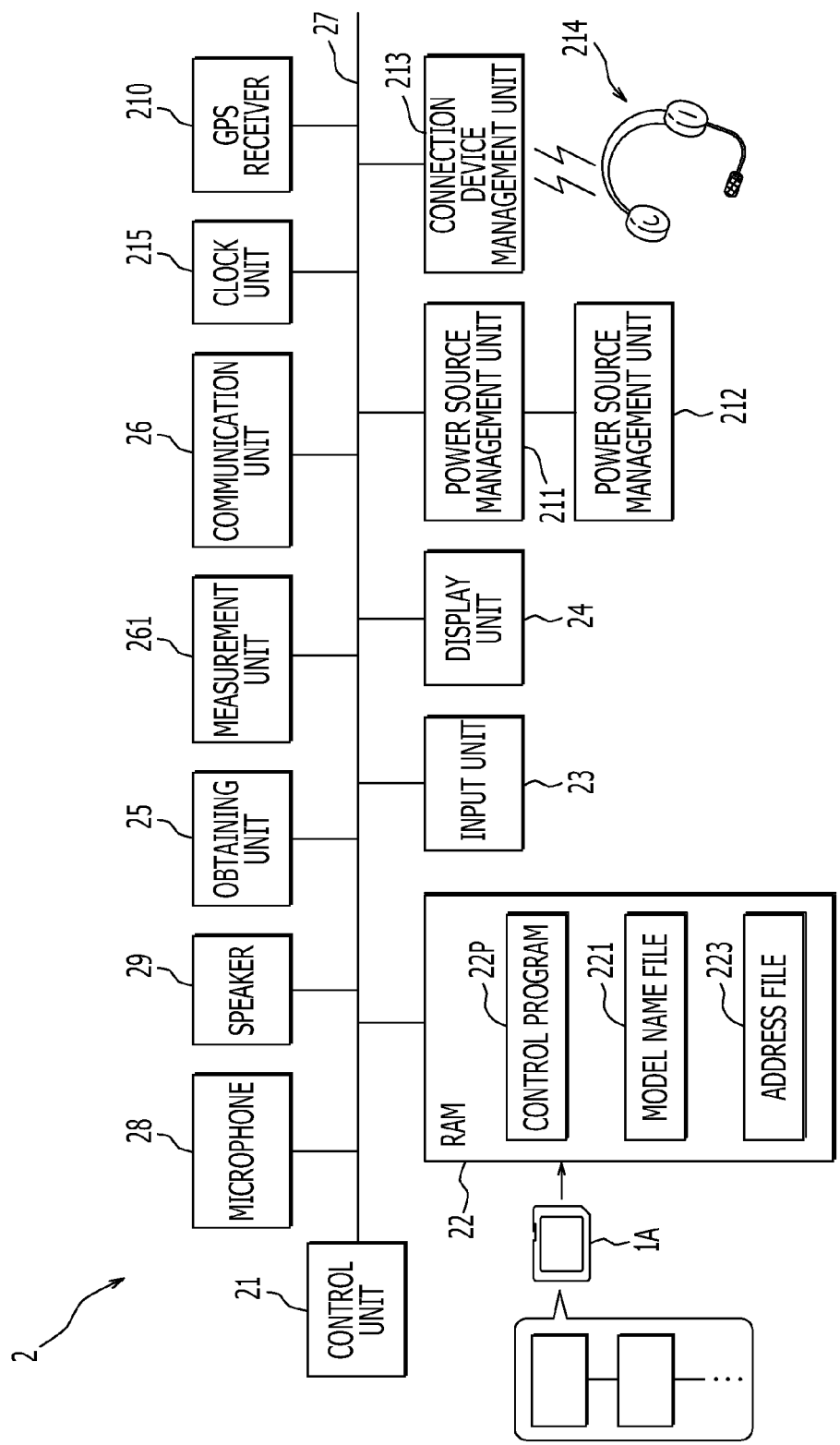
FIG. 19 depicts an example hardware configuration of the mobile phone device according to a sixth embodiment.

FIG. 19 depicts an example hardware configuration of the mobile phone device 2 according to a sixth embodiment. A program for operating the mobile phone device 2 according to the first to fifth embodiments may be read into a portable recording medium 1A such as a memory card and stored in the RAM 22 as in the sixth embodiment. Also, the program may also be downloaded from another server computer (not depicted) connected via the communication network N such as the internet. The content will be described below.

The mobile phone device 2 depicted in FIG. 19 reads the program for executing the above-mentioned processing from the portable recording medium 1A. Alternatively, the mobile phone device 2 downloads the program for executing the above-mentioned processing via the communication network N from another server computer (not depicted). The program is installed as the control program 22P and loaded onto the RAM 22 for execution. With this configuration, the device functions as the above-mentioned mobile phone device 2. The mobile phone devices 3 and 5 are also similar, and a detailed description thereof will be omitted.

The present sixth embodiment is as described above, and the other configuration is similar to the first to fifth embodiments. Therefore, corresponding parts are assigned with the same reference symbols, and a detailed description thereof will be omitted.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A communication device, comprising:
   a memory that stores a program;
   a processor that executes, based on the program, a procedure comprising:
   obtaining first use state information of the communication device during a call with a second communication device;
   transmitting, to the second communication device, a command for making the second communication device transmit second use state information of the second communication device to a computer; and
   transmitting the first use state information obtained to the computer.

2. The communication device according to claim 1, wherein the procedure further comprises:
   receiving a second command for the first use state information from the second communication device, wherein the obtaining further obtains the first use state information when the second command is received.

3. The communication device according to claim 1, wherein the procedure further comprises:
   measuring a communication state,
   wherein the obtaining obtains the first use state information when the measuring measures the communication state in a specified condition.

4. The communication device according to claim 1, wherein the procedure further comprises:
   predicting a change in a communication state during the call,
   wherein the obtaining obtains the first use state information when the predicting predicts a change in the communication state.

5. The communication device according to claim 1, wherein the procedure further comprises:
   accepting an input of the command for the first use state information,
   wherein the obtaining obtains the first use state information when the accepting accepts the input of the command.

6. The communication device according to claim 3, wherein
   the obtaining further obtains the first use state information again when the measuring measures the communication state in the specified condition after the first use state information is obtained.

7. The communication device according to claim 4, wherein
   the obtaining further obtains the first use state information again when the predicting predicts the change in the communication state after the first use state information.

8. The communication device according to claim 5, wherein the procedure further comprises:
   obtaining the first use state information again when the accepting accepts the input of the command after the first use state information is obtained.

9. The communication device according to claim 6, wherein
   the transmitting transmits the command for the second use state information to the second communication device when the obtaining obtains the first use state information.

10. The communication device according to claim 1, wherein the computer is connected with the communication device via a communication network.

11. The communication device according to claim 10, wherein the procedure further comprises:
   receiving information indicating that an abnormality exists in the second communication device and information indicating a factor for the abnormality from the computer.

12. The communication device according to claim 11, wherein the receiving further receives information indicating that an abnormality exists in the first communication device and information indicating a factor for the abnormality from the computer.

13. A communication system, comprising:
a first communication device comprising:
a first memory that stores a first program;
a first processor that executes, based on the first program, a first procedure comprising:
obtaining first use state information of the first communication device during a call with a second communication device;
transmitting a command for making the second communication device transmit second use state information of the second communication device to a server computer; and
transmitting the first use state information obtained to the server computer after the command is transmitted;
the second communication device comprising:
a second memory that stores a second program;
a second processor that executes, based on the second program, a second procedure comprising:
obtaining the second use state information when the command is received; and
transmitting the second use state information obtained to the server computer; and
the server computer comprising:
a communication unit that receives the first use state information and the second use state information; and
a control unit that determines whether or not an abnormality exists by referring to a storage unit storing reference state information for determining the abnormality, the received first use state information, and the received second use state information.

14. The communication system according to claim 13, wherein the control unit determines an abnormality of the first communication device based on the reference state information in the storage unit and the first use state information, and
determines an abnormality of the second communication device based on the reference state information in the storage unit and the second use state information.

15. The communication system according to claim 14, wherein the communication unit further transmits, when the control unit determines the abnormality of the first communication device, information indicating that the abnormality of the first communication device and information indicating a factor for the abnormality to the first communication device and transmits the information indicating the abnormality of the first communication device to the second communication device.

16. The communication system according to claim 14, wherein the communication unit further transmits, when the control unit determines the abnormality of the first communication device, information indicating that the abnormality of the second communication device and information indicating a factor for the abnormality to the second communication device and transmits the information indicating the abnormality of the second communication device to the first communication device.

17. A communication method, comprising:
obtaining first use state information indicating a use state of a first communication device during a call with a second communication device;
obtaining second use state information of the second communication device when the first use state information of the first communication device is obtained by transmitting a command for the second use state information from the first communication device to the second communication device;
transmitting the first use state information and the second use state information to a server computer; and
determining, using a control unit in the server computer, whether or not an abnormality exists by referring to a storage unit storing reference state information for determining an abnormality, the received first use state information, and the received second use state information.

18. The communication method according to claim 17, wherein the determining determines an abnormality of the first communication device based on the reference state information of the storage unit and the first use state information and an abnormality of the second communication device on the basis of the reference state information of the storage unit and the second use state information.

19. The communication method according to claim 17, further comprising:
receiving information indicating that an abnormality exists in the second communication device and information indicating a factor for the abnormality from the server computer.

20. The communication method according to claim 19, further comprising:
receiving information indicating that an abnormality exists in the first communication device and information indicating a factor for the abnormality from the computer.

* * * * *

UNITED STATES PATENT AND TRADEMARK OFFICE
CERTIFICATE OF CORRECTION

PATENT NO.         : 8,565,754 B2
APPLICATION NO.    : 12/816453
DATED              : October 22, 2013
INVENTOR(S)        : Masahide Noda et al.

It is certified that error appears in the above-identified patent and that said Letters Patent is hereby corrected as shown below:

In the Claims

In Column 26, Line 47, In Claim 7, delete "information." and insert -- information is obtained. --, therefor.

Signed and Sealed this
Eighteenth Day of February, 2014

Michelle K. Lee
*Deputy Director of the United States Patent and Trademark Office*